(12) United States Patent
Pan et al.

(10) Patent No.: US 9,245,164 B2
(45) Date of Patent: Jan. 26, 2016

(54) BIOMETRIC AUTHENTICATION DEVICE AND METHOD

(71) Applicant: TrueLight Corporation, Hsinchu (TW)

(72) Inventors: Jin Shan Pan, Hsinchu (TW); Chih Cheng Chen, Zhongli (TW); Chia Ching Chang Chien, Kaohsiung (TW)

(73) Assignee: TrueLight Corporation (TW)

( * ) Notice: Subject to any disclaimer, the term of this patent is extended or adjusted under 35 U.S.C. 154(b) by 278 days.

(21) Appl. No.: 13/788,959

(22) Filed: Mar. 7, 2013

(65) Prior Publication Data

US 2014/0086459 A1   Mar. 27, 2014

(30) Foreign Application Priority Data

Sep. 27, 2012   (TW) .............................. 101135647 A

(51) Int. Cl.
*G06K 9/00*   (2006.01)

(52) U.S. Cl.
CPC ........ *G06K 9/00006* (2013.01); *G06K 9/00046* (2013.01); *G06K 9/00892* (2013.01); *G06K 2009/0006* (2013.01); *G06K 2009/00932* (2013.01)

(58) Field of Classification Search
None
See application file for complete search history.

(56) References Cited

U.S. PATENT DOCUMENTS

| 8,189,881 | B1 * | 5/2012 | Smits ............................. 382/124 |
| 2004/0184641 | A1 * | 9/2004 | Nagasaka et al. ............. 382/124 |
| 2005/0169506 | A1 * | 8/2005 | Fenrich et al. ................ 382/127 |
| 2010/0245556 | A1 * | 9/2010 | Kanda et al. .................... 348/77 |
| 2011/0200237 | A1 * | 8/2011 | Nakamura et al. ............ 382/127 |

FOREIGN PATENT DOCUMENTS

| JP | 2004-265269 | 9/2004 |
| JP | 2006-72764 | 3/2006 |
| JP | 2007/534421 | 11/2007 |
| JP | 2008-269259 | 11/2008 |
| JP | 2010-503079 | 1/2010 |
| JP | 2010-131180 | 6/2010 |
| WO | WO2009/019809 | 2/2009 |

OTHER PUBLICATIONS

Office Action for Taiwan Application 101135647.

* cited by examiner

*Primary Examiner* — Sumati Lefkowitz
*Assistant Examiner* — Ryan P Potts

(57) ABSTRACT

A biometric authentication device uses IR-VCSELs as light sources for performing a better biometric authentication by providing clearer images. A light guide module is introduced to minimize the size of the device. Moreover, the biometric authentication device uses a single image sensing module to gather the vein image and the fingerprint image into the same detection signal which is then analyzed and compared with the pre-stored vein feature data and fingerprint feature data. Therefore, the biometric authentication device can achieve an approach in lowering hardware costs, simplifying circuit designs and providing an outstanding performance.

18 Claims, 16 Drawing Sheets

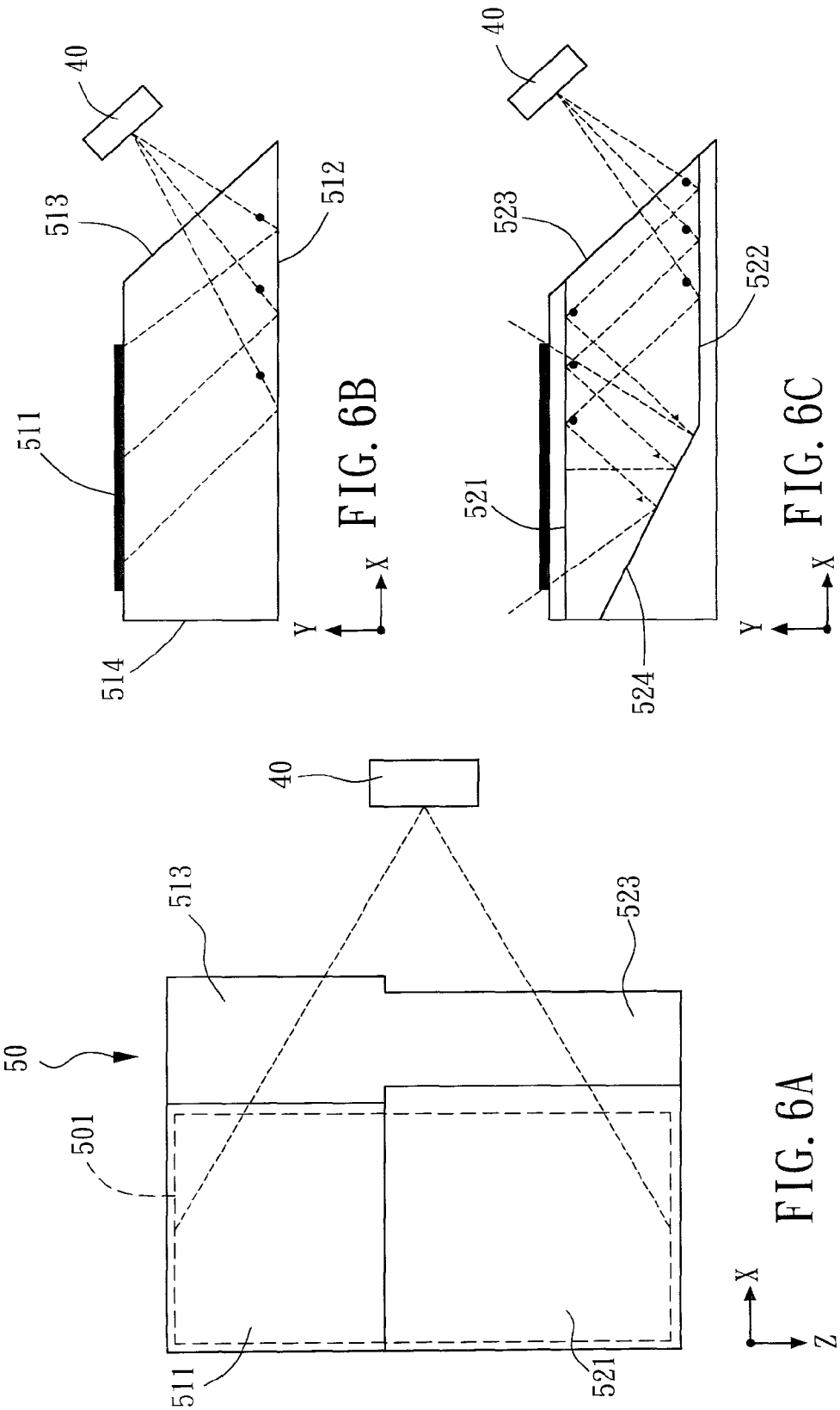

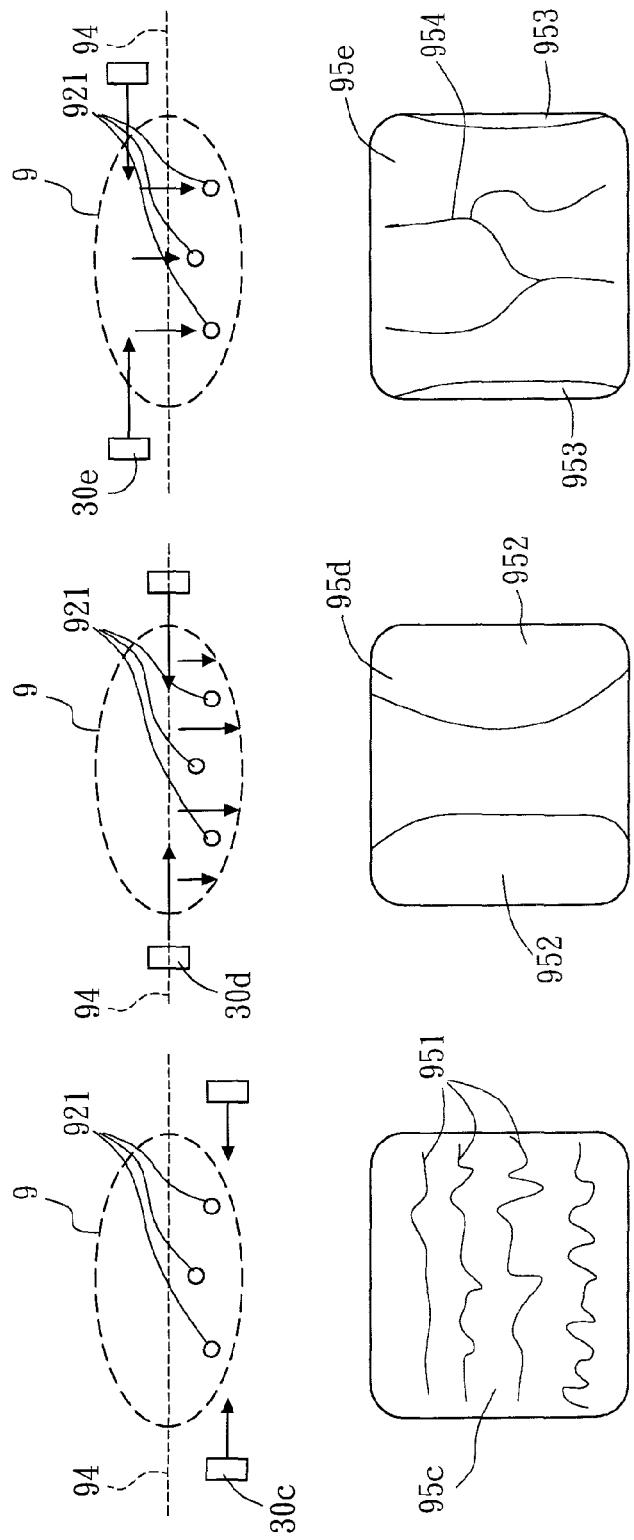

BIOMETRIC AUTHENTICATION DEVICE AND METHOD

This application claims the benefit of Taiwan Patent Application Serial No. 101135647, filed Sep. 27, 2012, the subject matter of which is incorporated herein by reference.

BACKGROUND OF INVENTION

1. Field of the Invention

The invention relates to a device and a method for biometric authentication, and more particularly to the biometric authentication device and method which include the image-capturing and detecting the fingerprint and vein images of a user finger for identification.

2. Description of the Prior Art

To ensure security over conventional digital personal identification techniques such as those applying personal identification numbers, digital keys, hardware keys having built-in smart chips and so on, more and more personal identification and security systems are interested in adopting biometric authentication apparatuses, such as the biometric authentication apparatus by judging the fingerprints and/or vein growth under the skin.

In the art, the fingerprint authentication technique can be seen in various Taiwan patents, such as those having the publication numbers 565094, M343215 and 201145179. Yet, in all of those teachings, the identification technique does involve only the identification upon fingerprints. Such a single biometric authentication means obviously provides only limited security protections. Further, in the aforesaid teachings, visible light sources are commonly used and thus inhibited to further detections, for example the investigation through the vein growth of the finger. The foregoing visible light sources are reflective light sources and are projected upward onto the contact surface between the first finger member of user finger and the device so as to generate reflective lights from the contact surface, which is further captured by the device to analyze the fingerprint image. However, though the vein image can be formed by the hemoglobin absorbing lights with specific wavelengths, yet these particular lights with specific wavelengths do not include the visible lights. Furthermore, this conventional fingerprint authentication needs to go through the finger to be depressed substantially onto the contact surface, and such a depression would change the density of the depressed portion on the finger and thus change the original distribution of the veins thereinside. Therefore, it is obvious that the aforesaid authentication method can only be applied to identify the fingerprint, but not relevant to the vein structure inside the first finger member of the tested finger.

In a US patent with a publication number 20090185726, a 4-in-1 imaging apparatus is provided able to recognize an image for authentication of a user in reading the fingerprint, the finger vein, the palm and the palm vein. However, in this disclosure, only two application pairs are included; in which one is the pair of the fingerprint and the finger vein, and another is the pair of the palm and the palm vein. From the teaching, a time-division is performed to control two reflective light sources at different positions for processing the feature identifications. That is to apply a light source to verify the fingerprint and/or the palm, and another light source to verify the finger vein and/or the palm vein. Apparently, in this teaching, one more control circuit is required to share the identifications and thus complicated circuiting design is inevitable.

In two related Taiwan patents with publication numbers M375256 and 201211914, vein identification techniques are taught, respectively. However, a common feature in between is that only the vein authentication technique is provided, and so it is clear that such an identification application is less secured. Further, in M375256, the whole apparatus is too big in occupation for lacking a relevant light guiding mechanism, while, in 201211914, neither an appropriate optical system nor a light guiding mechanism is disclosed.

In a Taiwan patent with a publication number 200947315, a technique to verify both the fingerprint and the finger vein is disclosed. However, in this teaching, major efforts are focused on circuit design and data processing in image and identification verifications, and again neither an appropriate optical system nor a light guiding mechanism is disclosed. Further, in this teaching, 2-D capacitor types of the fingerprint image sensor and the vein image sensor are introduced to perform in order the fingerprint image and the vein image, and it is apparently that such an application can only contribute to a high hardware cost. Also, for two image sensors for different imaging processes are needed in this teachings, thus substantial difficulties and complexities in circuiting and imaging can be foreseen.

In a US patent with a publication number 20110129128, a technique to verify both the fingerprint and the finger vein is also disclosed. In this teaching, major efforts are focused on circuit design and data processing in image and identification verifications, and again neither an appropriate optical system nor a light guiding mechanism is disclosed. Further, in this teaching, a resistance type or a capacitor type of semiconductor sensing plate is introduced to detect the fingerprint, while another image sensor accompanying a light source is to capture and identify the vein image. Obviously, different sensors for imaging the fingerprint and the vein can result in a higher hardware cost and more complicated circuiting for providing two sets of sensors for separate image capturing and data processing.

In all the foregoing teachings, a common shortcoming is noticed. The common shortcoming is to regard the vein authentication method in palm or fingers, in which the feature of the oxygen-deficient hemoglobin in the vein to absorb lights with specific wavelengths is utilized to make possible the image capturing and further analyzing upon the vein by the CMOS or CCD, before a verification upon a user according to his/her biometric can be performed. However, according to the present art, the IR LED is the most popular light source and has a wider spectrum by compared to a laser diode. A wider spectrum for the IR LED implies that part of the lights would be absorbed by the peripheral tissues around the vein and consequently noises would be generated therefrom to further form obstacles for further image analysis. Therefore, by compared to the laser diode as a light source, the IR LED can only obtain an obscure image and thus an improvement thereupon is clear.

SUMMARY OF THE INVENTION

Accordingly, A first purpose of the present invention is to provide a biometric authentication device, which an Infra-red (IR) Vertical-cavity Surface-emitting Laser (VCSEL) is used as a light source for the device. By utilizing the VCSEL to obtain more clear images for biometric authentication, the later-stage processing upon the images can be benefited therefrom so that the cost can be reduced and the performance can be enhanced by capturing more clearer and contrast enhanced images, by simplifying the following signal-processing and comparison, and by efficiently applying the software and the later stage elements.

A second purpose of the present invention is to provide a biometric authentication device that can use a particular optical light guide mechanism to miniaturize the biometric authentication module such that the device can be applied to the portable apparatus such as notebook computers, tabular computers, and smart mobile phones.

A third purpose of the present invention is to provide a biometric authentication device and method that can introduce a single image-sensing unit to simultaneously capture both the vein image and the fingerprint image into the same sensor signal so as to carry out follow-up analysis upon the vein and the fingerprint characteristics. Also, the feature of requiring only an image-sensing unit can contribute to reduce the hardware cost, to simplify the circuiting design of the circuit board, and to provide an efficiency processing.

In the present invention, the biometric authentication device for identifying at least a biometric on a portion of the creature (portion-to-be-verified and PTBV, thereinafter) includes:

a carrier base, having an upper opening for receiving the portion-to-be-verified, which the upper opening further has a base plane and at least one lateral surface;

a position structure, located at the carrier base at a position respective to the upper opening, the position structure being used to assist the portion-to-be-verified to anchor at a predetermined position at the carrier base in the upper opening;

at least one light source unit, located at the at least one lateral surface of the carrier base respective to the upper opening; in the case that the portion-to-be-verified reaches the predetermined position, the at least one light source unit being positioned laterally to the portion-to-be-verified, the at least one light source unit being able to project a lateral light onto the portion-to-be-verified, and at least one corresponding image response being generated;

a light guide module, located inside the carrier base at a position under the base plane respective to the upper opening; and an image-sensing unit, located inside the carrier base to receive the at least one image response and further to form thereby a corresponding detection signal readable to a computer.

In one embodiment of the present invention, the biometric authentication device can further include a filter of visible lights mounted inside or outside the lens of the image sensor so as thereby to filter out the visible lights and thus to increase the pattern identification on lights of specific wavelengths.

To achieve the aforesaid first purpose of the present invention, the at least one light source unit further includes a plurality of Infra-red Vertical-cavity Surface-emitting Lasers (IR-VCSELs), and a vertical height h1 between a mean central point of the at least one light source unit at a perpendicular direction and the base plane of the upper opening is no less than one half of a mean vertical thickness h2 of the PTBV. By utilizing the VCSELs and/or IR-VCSELs to obtain more clear images for biometric authentication, the later-stage processing upon the images can be benefited therefrom so that the cost can be reduced and the performance can be enhanced by capturing more clearer and contrast-enhanced, by simplifying the following signal-processing and comparison, and by efficiently applying the software and the later stage elements.

To achieve the aforesaid second purpose of the present invention, the light guide module can have at least one prism unit and be separated into a fingerprint-detecting area and a vein-detecting area. When the at least one lateral light projects on the PTBV, a fingerprint image and a vein image can be formed on the image-sensing unit through the fingerprint-detecting area and the vein-detecting area of the light guide module, respectively. Hence, such a particular optical light guide mechanism of the present invention can efficiently miniaturize the biometric authentication module.

To achieve the aforesaid third purpose of the present invention, by providing the at least one light source unit to project the at least lateral light onto the PTBV, a fingerprint image and a vein image corresponding to the PTBV can be formed simultaneously. The fingerprint image and the vein image are formed on the image-sensing unit through the light guide module. Hence, the detection signal produced by the image-sensing unit and being readable to a computer can contain simultaneously messages of the fingerprint image and the vein image. Also, the feature of requiring only an image-sensing unit to obtain both kinds of images can contribute to reduce the hardware cost, to simplify the circuiting design of the circuit board, and to provide an efficiency processing.

In addition, according to the present invention, the biometric authentication method for verifying at least a biometric on a portion of a creature (portion-to-be-verified or PTBV, thereinafter) comprises the steps of:

providing a biometric authentication device, in which the biometric authentication device further includes a carrier base, at least one light source unit, an image-sensing unit and a control module; the carrier base being used to receive the PTBV, the at least one light source unit being to project a light onto the PTBV so as to generate a fingerprint image and a vein image corresponding to the PTBV, the image-sensing unit being to receive the fingerprint image and the vein image and thereby further to generate a detection signal readable to a computer; wherein the detection signal includes simultaneously messages of the fingerprint image and the vein image; wherein the control module connecting electrically at least with the at least one light source unit and the image-sensing unit is to receive the detection signal from the image-sensing unit;

arranging the PTBV to the biometric authentication device so as thereby to generate simultaneously the detection signal including the messages of the fingerprint image and the vein image;

the control module of the biometric authentication device receiving the detection signal and further extracting thereinside a fingerprint feature data from the fingerprint image and a vein feature data from the vein image; and applying a comparison unit to compare the fingerprint feature data and the vein feature data received from the image-sensing unit of the control module with the fingerprint feature data and the vein feature data pre-stored in the feature database so as to generate and output a comparison result.

In one embodiment of the present invention, the biometric authentication device can further include a filter of visible lights mounted inside or outside the lens of the image sensor so as thereby to filter out the visible lights and thus to enhance the image performance on lights of specific wavelengths.

All these purposes are achieved by the biometric authentication device and method described below.

BRIEF DESCRIPTION OF THE DRAWINGS

The present invention will now be specified with reference to its preferred embodiment illustrated in the drawings, in which:

FIG. 6A shows schematically, in a top view, the effective detection area above the prism unit of the light guide 50 of FIG. 1;

FIG. 6B shows schematically the optical path in the fingerprint-detecting area 51 of the prism unit of FIG. 6A;

FIG. 6C shows schematically the optical path in the vein-detecting area 52 of the prism unit of FIG. 6A;

FIG. 12A shows schematically a first example of vein detection in accordance with the present invention;

FIG. 12B shows schematically a second example of vein detection in accordance with the present invention; and FIG. 12C shows schematically a third example of vein detection in accordance with the present invention.

DESCRIPTION OF THE PREFERRED EMBODIMENT

The invention disclosed herein is directed to a device and a corresponding method for biometric authentication of a creature. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
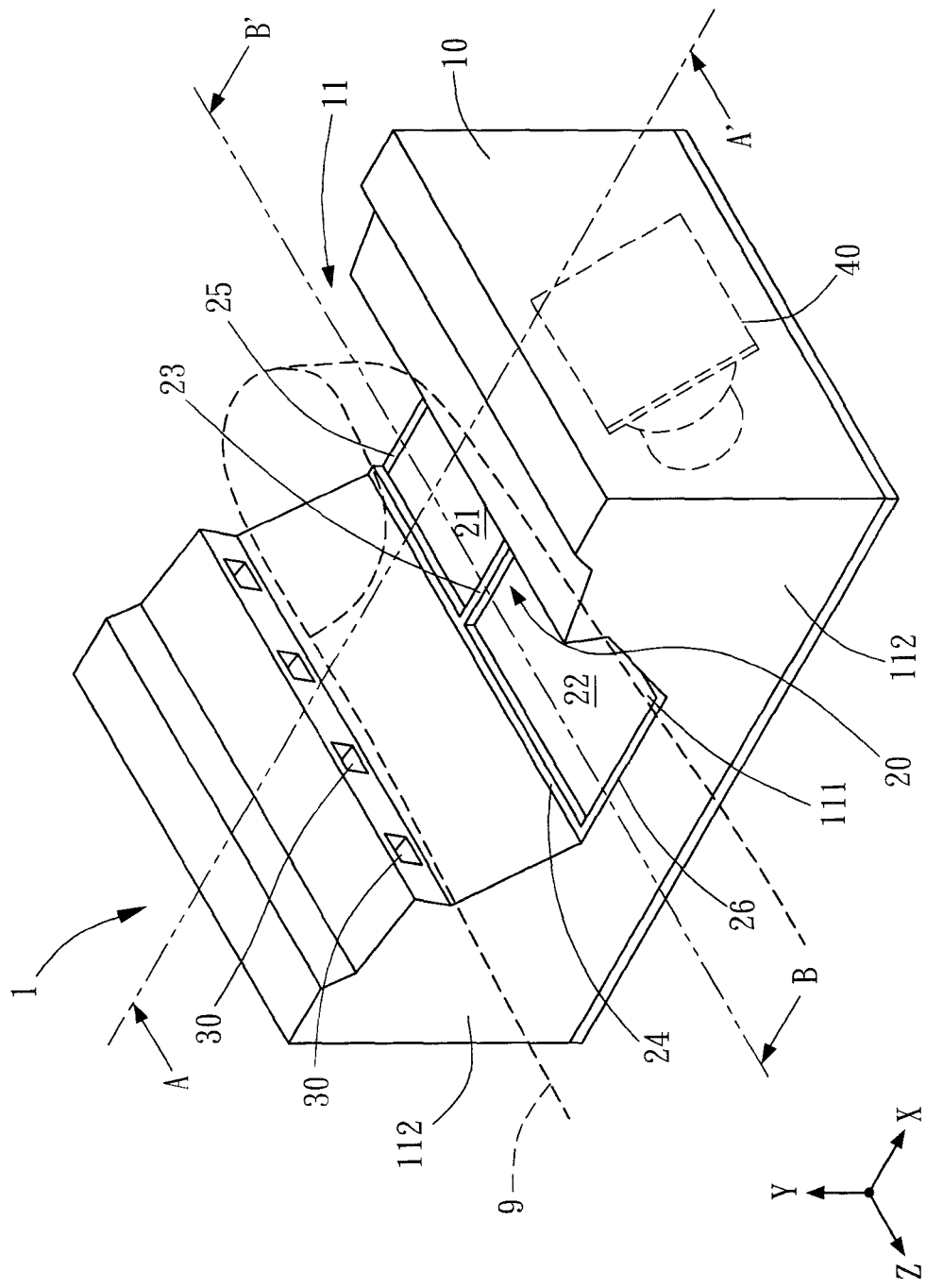
FIG. 1 is a schematic perspective view of a first embodiment of the biometric authentication device in accordance with the present invention.
Figure 2B:
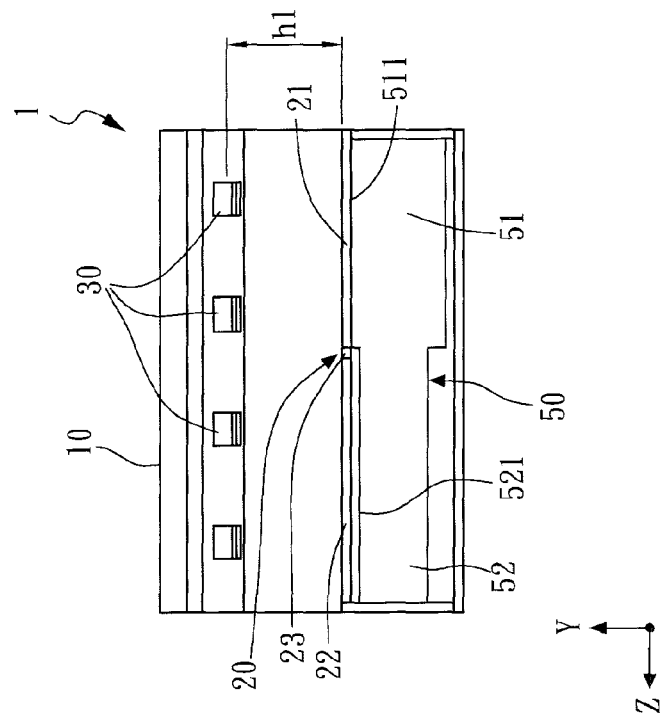
FIG. 2B is a cross-sectional view of FIG. 1 along line B-B'.
Figure 2A:
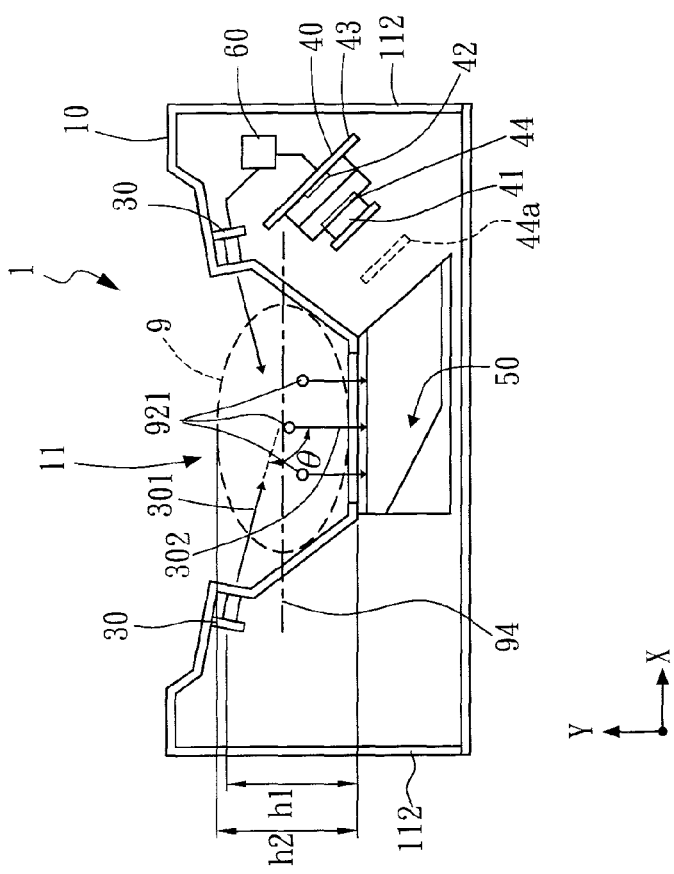
FIG. 2A is a cross-sectional view of FIG. 1 along line A-A'.

Referring now to FIG. 1, FIG. 2A and FIG. 2B, a perspective view of the first embodiment of the biometric authentication device in accordance with the present invention, a cross-sectional view along line A-A' of FIG. 1 and a cross-sectional view along line B-B' of FIG. 1 are shown, respectively. In this embodiment, the biometric authentication device 1 for verifying at least a biometric on a portion of the creature (portion-to-be-verified and PTBV, thereinafter) includes a carrier base 10, a position structure 20, at least one light source unit 30, an image-sensing unit 40, a light guide module 50 and a control module 60. In the present invention, the PTBV is embodied as a finger; particularly and preferably, the first finger member and the second finger member of the index finger. However, the PTBV can also be any of the middle finger, the thumb, the ring finger and the little finger.

The carrier base 10 has an upper opening 11 for receiving the PTBV 9, in which the upper opening 11 further has a base plane 111 and at least one lateral surface 112. In this embodiment as shown, the carrier base 10 includes two opposing lateral surfaces 112 extending upright to the respective sides of the base plane 111 so as to form a U shape structure in the carrier base 10, referred to FIG. 2A. The middle empty portion of the U shape structure in the carrier base 10 is the upper opening 11. In the case that the finger 9 to be tested is in the upper opening 11, the finger 9 extends in the upper opening 11 between two opposing lateral surfaces 112, by having the first finger member located largely at the front half portion of the upper opening 11 while the second finger member is located largely at the rear half portion of the upper portion 11.

The position structure 20 is located at the carrier base 10 at a position respective to the base plane 111 of the upper opening 11. The position structure 20 is used to assist the PTBV 9 to anchor at a predetermined position at the carrier base 10 in the upper opening 11.

Figure 4A:
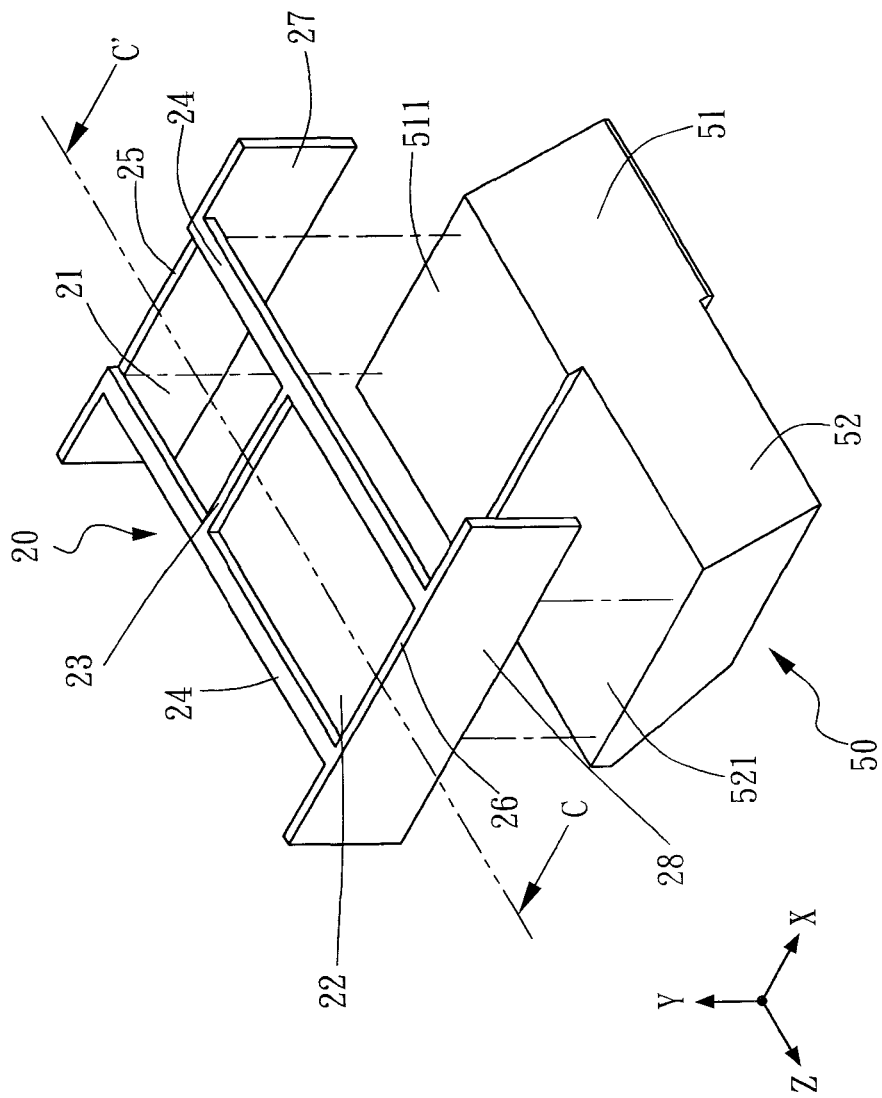
FIG. 4A shows explodedly the position structure 20 and the light guide module 50 of FIG. 1.
Figure 4B:
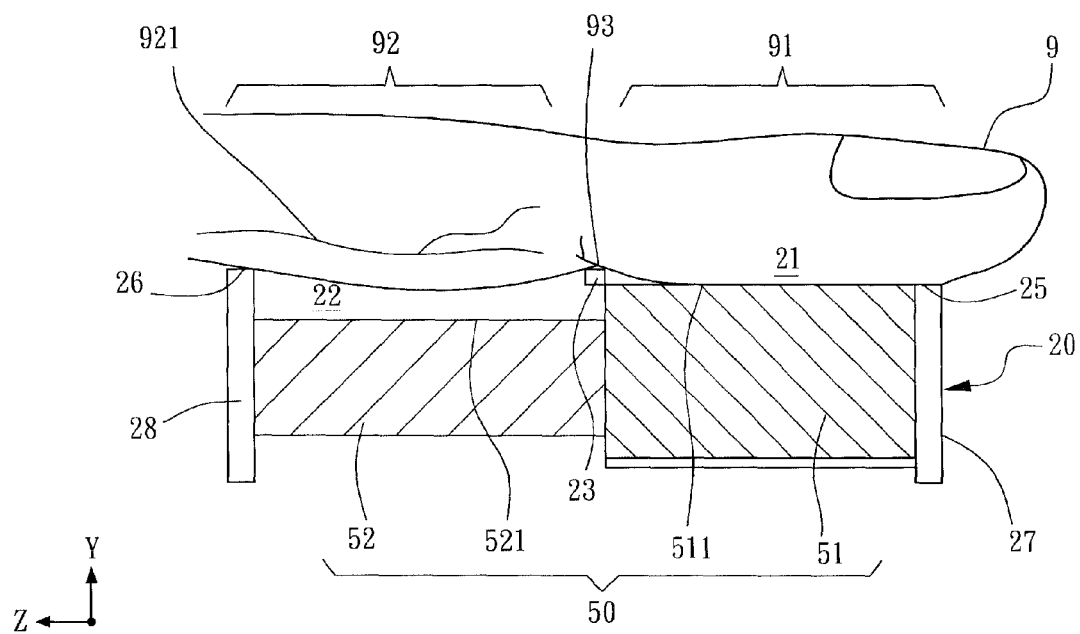
FIG. 4B is a schematically cross-sectional view of FIG. 4A along line C-C'.

Referring now to FIG. 4A and FIG. 4B, an exploded view of the position structure 20 and the light guide module 50 of the first embodiment of FIG. 1 and a cross-sectional view of FIG. 4A along line C-C' are shown, respectively. In this embodiment, the position structure 20 embodied as a finger-anchoring structure further includes a front window 21, a rear window 22 and a position rib 23 between the front window 21 and the rear window 22. As shown in FIG. 4B, by having an inter-member valley 93 between the first finger member 91 and the second finger member 92 to fall onto the position rib 23, the first finger member 91 can be anchored in the front window 21 and the second finger member 92 can be anchored in the rear window 22 includes a front window. At this time, the front lower end of the first finger member 91 would be rested on the front finger-anchoring area 25 of the position structure 20 so as to have the lower surface (having the fingerprint) of the first finger member 91 to contact tightly onto the top surface of the fingerprint-detecting area of the light guide module 50, and thereby the fingerprint can be captured. Also, the rear lower end of the second finger member 92 would be rested on the rear finger-anchoring area 26 of the position structure 20, and thus the lower surface of the second finger member 92 would face, but not depress, the vein-detecting area of the light guide module 50 so as to facilitate the capturing process of the vein image. In practice, the front finger-anchoring area 25 is lower than the position rib 23 and the rear finger-anchoring area 26, such that a non-contact space would be formed between the upper surface of the vein-detecting area and the second finger member 92. Upon such an arrangement, the plenty area of the vein 921 in the finger can be arranged to be detected, without sacrificing the detection of the fingerprint. In addition, the position structure 20 can have at least one light-shielding plate 24, a front plate 27 and a rear plate 28. The light-shielding plate 24 is located between the at least one light source unit 30 and the light guide module 50 and is there to avoid the light to enter the light guide module 50 from areas other than the front and rear windows 21, 22 of the position structure 20, and thus substantial improvement upon the over-exposure phenomenon around the finger caused by the environmental lights and the diffractive lights can be obtained. In addition, possibility of the noise lights to enter the light guide module 50 from the front and rear windows 21, 22 of the position structure 20 can be also reduced. As shown, for the front and rear plates 27, 28 are to set along the front and rear surfaces of the light guide module 50, comprehensive positioning help can be obtained while in assembling the light guide module 50 to the position structure 20, and also a light-shielding effect against the noise light to enter the light guide module 50 via the front and rear surfaces thereof can be achieved.

In the present invention, the at least one light source unit 30 is located inside the carrier base 10 at a position respective the at least one lateral surface 112 of the upper opening 11. As shown in this embodiment shown in FIG. 1, FIG. 2A and FIG. 2B, a plurality of the light source unit 30 are included at each of the two lateral surfaces 112. When the PTBV 9 is located at the predetermined position in the upper opening 11, the light source units 30 are just lined to both lateral sides of the PTBV 9, and at least one lateral light can be projected onto the PTBV so as to generate at least one image corresponding to the PTBV 9.

In the present invention, the at least one light source unit 30 includes a plurality of IR-VCSELs, preferably the IR-VCSELs having a wavelength between 780 nm and 850 nm. In this embodiment, the PTBV 9 is at least a portion of the first and second finger members 91, 92 of the finger 9. When the PTBV 9 is set at the predetermined position inside the upper opening 11, the plural IR-VCSELs 30 are lined to a lateral side of the PTBV 9 in a parallel manner; i.e. extending along the direction the same as the first and second finger members 91, 92 extend. Also, a vertical height h1 between a mean central point of the at least one light source unit 30 at a perpendicular direction and the base plane 111 of the upper opening 11 is no less than one half of a mean vertical thickness h2 of the PTBV 9. For example, the mean vertical thickness h2 of the second finger member of the index finger for an ordinary adult is ranged between 0.8 cm and 1.6 cm. Accordingly, to produce the biometric authentication device of the present invention suitable almost to all ordinary people, the vertical height h1 between a mean central point of the at least one light source unit 30 at a perpendicular direction and the base plane 111 of the upper opening 11 is preferably larger than or equal 0.8 cm. By providing the biometric authentication device 1 of the present invention, the VCSELs and/or IR-VCSELs are utilized to obtain more clear images for biometric authentication application by their narrower spectrum (i.e., narrower distribution of the wavelength), so that the later-stage processing upon the images can be benefited therefrom. Namely, with clearer and contrast-enhanced image, many benefits from simplifying the comparison time and hardware processing and from reducing the processing elements, the cost can be reduced. However, for the IR-VCSEL is a high-directional element featured in torch-type illumination, a narrow divergence angle and a narrower optical spectrum, the option of applying the conventional reflective light source to the IR-VCSEL of the present invention would induce local (spots like) over-exposure or uneven exposure.

As described above, the biometric authentication device 1 of the present invention is to arrange the at least one light source unit 30 at a vertical position higher than the PTBV 9 (compared at the horizontal center line 94). Also, the light projected from the at least one light source unit 30 to the PTBV 9 is a lateral light, not like the overhead light in the art. Upon such an arrangement, conventional shortcomings in exposure such as the aforesaid surface exposure and over-exposure can be greatly reduced.

As shown in FIG. 2A, the at least one lateral light projected by the at least one light source unit 30 defines a virtual central projection line 301. The lateral light is deflected and/or reflected by the PTBV 9 to produce a corresponding image response. The image response goes downward into the carrier base 10 along a line defining a virtual vertical projection line 302, and the angle θ between the virtual central projection line 301 and the virtual vertical projection line 302 is ranged between 30 and 150 degrees. More specifically, when the vertical height h1 is equal to one half of the mean vertical thickness h2, the angle θ is preferably ranged between 30 and 85 degrees. For the at least one light source unit 30 is higher than the horizontal center line of the PTBV 9, and also for the angle θ is formed between the image response and the vertical direction, following advantages can be obtained: (1) the projection light won't hurt user eyes; (2) the oblique light projection can fit all sizes of the PTBV 9; and, (3) the arrangement of the light source units can help the lateral light to have a better penetration close to that of a direct penetrating light.

Figure 3B:
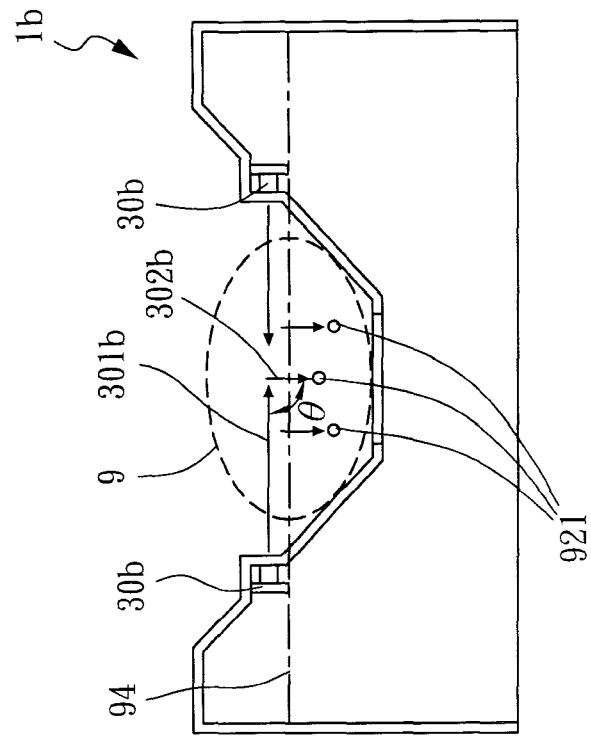
FIG. 3B shows a further embodiment of the light source unit in accordance with the present invention.
Figure 3A:
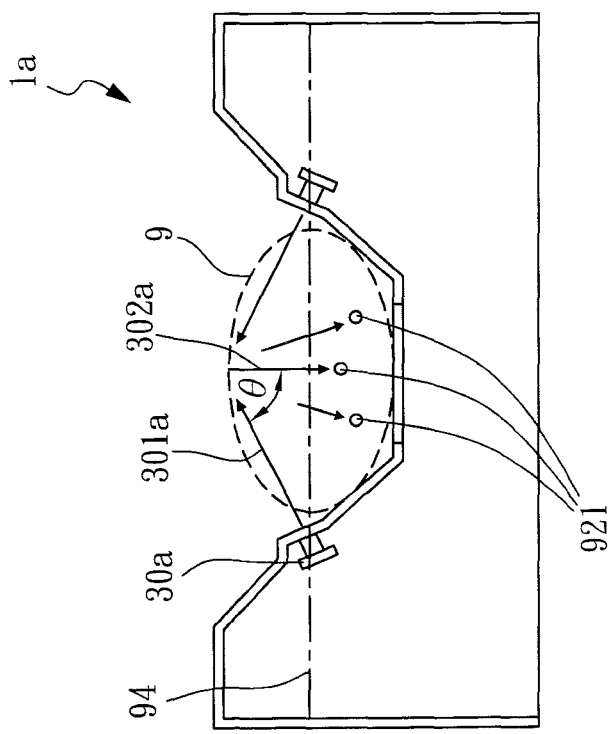
FIG. 3A shows another embodiment of the light source unit in accordance with the present invention.

Referring now to FIG. 3A and FIG. 3B, two arrangements of the light source unit applicable to the biometric authentication device 1a or 1b are shown, respectively. In FIG. 3A, the light source units 30a (i.e., IR-VCSELs) for the biometric authentication device 1a are mounted at a height substantially equal to the horizontal center line 94 of the PTBV 9, and the angle θ between the virtual central projection line 301a defined by the lateral light projected by the light source unit 30a and the virtual vertical projection line 302a defined by the at least one image response is ranged between 60 and 85 degrees. In FIG. 3B, the light source units 30b (i.e., IR-VCSELs) for the biometric authentication device 1b are mounted at a height higher than the horizontal center line 94 of the PTBV 9, and the angle θ between the virtual central projection line 301b defined by the lateral light projected by the light source unit 30b and the virtual vertical projection line 302b defined by the at least one image response is ranged between 75 and 105 degrees.

In the present invention, no matter what kind of the arrangement for the light source units is, either of FIG. 2A, FIG. 3A and FIG. 3B, the conventional over-exposure phenomenon upon the applications of the IR-VCSELs on the vein authentication practice can be effectively resolved, by amending the light projection (defined by the virtual central projection line 301, 301a or 301b) of the light source unit onto a position higher than the horizontal center line 94 of the finger (PTBV) 9. Also, by utilizing the internal light scattering of the finger 9, the vein image can be successfully obtained. The diffraction by the skin of the finger 9 can be blocked by the light-shielding plate 24. If the VCSEL light source units are to be mounted below the horizontal center line 94, the light-shield plate 24 would have problems in isolating the surface over-exposure area of the finger 9. In particular, if the VCSEL light source units are to be mounted right under the horizontal center line 94, problems in localized spots of over exposure and uneven exposure would become the truth.

Referring now to FIG. 12A, FIG. 12B and FIG. 12C, three typical plots are demonstrated to explain the relationship between the position of the finger and the vein image for applications of the VCSEL as the light source unit. As shown in FIG. 12A, in the case that the VCSEL light source unit 30c is positioned close to the bottom of the finger 9, the vein image 95c would show to have unclear vein lines due to the diffractive lines 951 on the finger surface. As shown in FIG. 12B, in the case that the VCSEL light source unit 30d is positioned on the horizontal center line 94 of the finger 9 and the light projection to the finger 9 is horizontal, the vein image 95d would show also to have unclear vein lines due to major over-exposure areas 952 at both sides of the finger 9. As shown in FIG. 12C, in the case that the VCSEL light source unit 30e is positioned higher than the horizontal center line 94 of the finger 9, the vein image 95e can then be clear enough to show readable vein lines 954 although minor over-exposure areas 953 do still exist at both sides of the finger 9. Hence, it is obvious that the arrangement of the light source units 30 in both positions and projection directions in accordance with the present invention can provide a solution to overcome the related disadvantages in the art.

In the present invention, the image-sensing unit 40 is located inside the carrier base 10 and posed by an oblique angle to facing the light guide module 50. The image-sensing unit 40 can receive the at least one image response of the PTBV 9 and can then thereby generate a detection signal readable to a computer. In the embodiment, the image-sensing unit 40 can further includes a lens set 41, an image sensor 42, a sensor circuit board 43 and a filter 44. The lens set 41 gathers the imaging lights from the light guide module 50 and then further forms corresponding images on the image sensor 42. The imager sensor 42 can be a CMOS, a CCD or any the like in the art. The sensor circuit board 43 is connecting electrically with the image sensor 42 and the control module 60. The filter 44 is to filter out the visible lights so as to enhance the identification rate upon some lights with specific wavelengths. In this embodiment, the filter 44 is installed inside to the lens set 41 (between the lens set 41 and the image sensor 42). Yet, in another embodiment, the filter 44a can also be installed outside to the lens set 41 (between the lens set 41 and the light guide module 50). In addition, the filter 44 can be a long pass filter or a bandpass filter for some specific wavelengths.

As shown in FIG. 2A, FIG. 2B, FIG. 4A and FIG. 4B, the light guide module 50 is located inside the carrier base 10 at a position under the base plane 111 of the upper opening 11. Specifically, the light guide module 50 is located right under the position structure 20. The at least one image response of the PTBV 9 enters downward into the carrier base 10 by penetrating the corresponding windows 21, 22 of the position structure 20 at the base plane 111 of the upper opening 11, and the at least one image response is led to the image-sensing unit 40 by the light guide module 50.

Figures 5A, 5B:
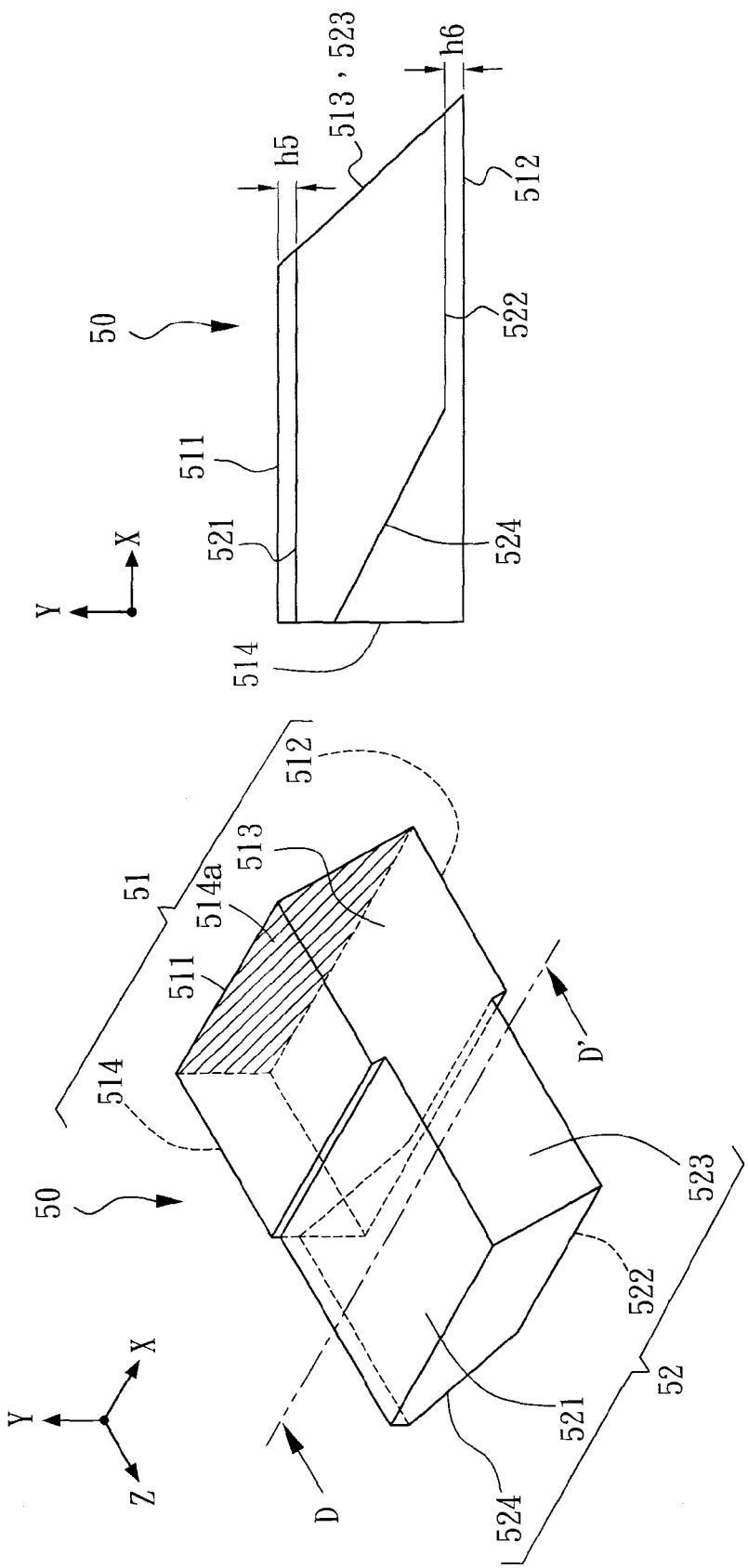
FIG. 5A is a perspective view of the light guide module 50 of FIG. 1.
FIG. 5B is a side view of FIG. 5A.

Refers now to FIG. 4A, FIG. 4B, FIG. 5A and FIG. 5B, in which FIG. 5A is a perspective view of the light guide module 50 of the first embodiment of the biometric authentication device in accordance with the present invention shown in FIG. 1 and FIG. 5B is a side view of FIG. 5A along line D-D'. The light guide module 50 includes at least one prism unit. In the first embodiment shown in FIG. 4A and FIG. 5A, the light guide module 50 includes a single prism unit, which is further divided into a fingerprint-detecting area 51 and a vein-detecting area 52. The fingerprint-detecting area 51 is located at a position corresponding to the front window 21, while the vein-detecting area 52 is located at a position corresponding to the rear window 22. When the at least one light source unit 30 projects the lateral light onto the PTBV 9, a fingerprint image and a vein image corresponding to the PTBV 9 are simultaneously generated. The fingerprint image and the vein image are further guided by the fingerprint-detecting area 51 and the vein-detecting area 52 of the light guide module 50, respectively, to simultaneously form images on the image-sensing unit 40. The image-sensing unit 40 then produces the corresponding detection signal readable to a computer and containing messages of the fingerprint image and the vein image. Namely, the single image (or pattern) as the detection signal produced by the image-sensing unit 40 contains simultaneously the fingerprint image and the vein image, and each of the fingerprint image and the vein image occupies almost half area of the single image. For example, the right hand side of the single image shows the fingerprint image, while the left hand side of the single image shows the vein image.

The fingerprint-detecting area 51 of the prism unit of the light guide module 50 further includes a top surface 511, a bottom surface 512 opposing to the top surface 511, an imaging surface 513 connecting in-between the top surface 511 and the bottom surface 512, an anti-reflection surface 514 opposing to the imaging surface 513, and a lateral anti-reflection surface 514a neighboring all the top surface 511, the bottom surface 512, the imaging surface 513 and the anti-reflection surface 514. The top surface 511 is also neighbored to the front window 21 of the position structure 20. When the PTBV 9 is anchored at the predetermined position in the upper opening 11, the first finger member 91 of the finger 9 contacts the top surface 511 of the fingerprint-detecting area 51. The fingerprint image entering the fingerprint-detecting area 51 of the prism unit (the light guide module 50) via the top surface 511 of the fingerprint-detecting area 51 would be reflected at least once by the bottom surface 512 of the fingerprint-detecting area 51 and then leave the fingerprint-detecting area 51 of the prism unit through the imaging surface 513 of the fingerprint-detecting area 51. An oblique angle of the imaging surface 513 of the fingerprint-detecting area 51 would help the leaving fingerprint image to form correctly on a corresponding half area of the image-sensing unit 40. On the anti-reflection surface 514 and the lateral anti-reflection surface 514a, an anti-reflection material or a light-absorbing material is thereon plated, sprayed, adhered, coated, or painted so as to reduce the reflection on the anti-reflection surface 514 and the lateral anti-reflection surface 514a while lights in the fingerprint-detecting area 51 are projected onto the anti-reflection surface 514 and the lateral anti-reflection surface 514a. Upon such an arrangement, the internal total reflection phenomenon that would degrade the imaging of the fingerprints can be substantially reduced.

The vein-detecting area 52 of the prism unit of the light guide module 50 further includes thereof a corresponding top surface 521, a corresponding bottom surface 522 opposing to the top surface 521, a corresponding imaging surface 523 connecting in-between the top surface 521 and the bottom surface 522, and a reflection surface 524 opposing to the imaging surface 523 and connecting obliquely the bottom surface 522. The top surface 521 of the vein-detecting area 52 is neighbored to the rear window 22 of the position structure 20. When the PTBV 9 is anchored at the predetermined position in the upper opening 11, the second finger member 92 of the finger 9 is located above the top surface 521 of the vein-detecting area 52 in a manner of having no contact in between. The vein image entering the vein-detecting area 52 of the prism unit (the light guide module 50) via the top surface 521 of the vein-detecting area 52 would be reflected at least once individually by the reflection surface 524, the top surface 521 and the bottom surface 522 of the vein-detecting area 52 and then leave the prism unit (the light guide module 50) through the imaging surface 523 of the vein-detecting area 52. An oblique angle of the imaging surface 523 of the vein-detecting area 52 would help the leaving vein image to form on another half area of the image-sensing unit 40. On the reflection surface 524 of the vein-detecting area 52, a mirror may be adhered thereon, or a material with a high reflective index can be thereon plated, sprayed, adhered, coated, or painted so as to reflect the light of the vein image and so as to form an internal total reflection inside the prism unit (the light guide module 50). The imaging optical path of the vein image is dependent on a vertical height between the top surface 521 and the bottom surface 522 of the vein-detecting area 52 and a reflection frequency of the vein image inside the vein-detecting area 52, in which the reflection frequency is determined by the oblique angle between the reflection surface 524 and the bottom surface 522 of the vein-detecting area 52.

As shown in FIG. 5B, it is noted that a height difference h5 exists between two top surfaces 511 and 521 of the fingerprint-detecting area 51 and the vein-detecting area 52. The height difference h5 is accounted to the optical path and is also there to enlarge the non-contact area under the second finger member 92 and thus able to enhance the identification of the vein lines with the help of the finger position rib 23 and the rear finger-anchoring area 26. Further, it is also noted that another height difference h6 exists between two bottom surfaces 512 and 522 of the fingerprint-detecting area 51 and the vein-detecting area 52. The height difference h6 determines the thickness difference of the prism unit (the light guide module 50) between the fingerprint-detecting area 51 and the vein-detecting area 52, and importantly is the key to determine if the fingerprint image and the vein image can be finally integrated as a unique signal.

As shown in FIG. 4A and FIG. 4B, for the prism unit (the light guide module 50) is located beneath the position structure 20, the workable detection range is smaller than the upper surface of the prism. Further, portion of the upper surface of the prism is shadowed by the light-shielding plate 24. The front finger-anchoring area 25 is defined on the position structure 20 in front of the fingerprint-detecting area 51, and is flush with the fingerprint-detecting area 51 of the prism unit (light guide module 50) so as thereby to provide a broader space for resting the finger. The rear finger-anchoring area 26 is defined on the position structure 20 at a position rear to the vein-detecting area 52, and is flush with the top surface 521 of the vein-detecting area 52 of the prism unit (light guide module 50) and the position rib 23. When the finger 9 is anchored in the upper opening 11, a non-contact area can be formed between the rear finger-anchoring area 26 and the position rib 28, and is there to prevent the second finger member 92 from any depression to distort the vein lines inside the second finger member 92.

Referring now to FIG. 6A, FIG. 6B and FIG. 6C, a top view of an effective detection area above the prism unit of the light guide 50 of FIG. 1, the optical path in the fingerprint-detecting area 51 of the prism unit of FIG. 6A, and the optical path in the vein-detecting area 52 of the prism unit of FIG. 6A are shown, respectively. For the light-shielding plate 24 blocks a portion of the space above the prism unit (the light guide module 50), the practical detection area of the device is smaller than the upper surface of the prism unit (the light guide module 50). The major difference in optical path between the fingerprint-detecting area 51 and the vein-detecting area 52 is that the optical path of the fingerprint image undergoes only one total reflection by the bottom surface 512 of the fingerprint-detecting area 51 inside the fingerprint-detecting area 51 before the fingerprint image goes to the image-sensing unit 40, while the optical path of the vein image undergoes subsequent reflections, one by the reflection surface 524, one by the top surface 521 and one by the bottom surface 522 (totally 3 reflections), inside the vein-detecting area 52 before the vein image goes to the image-sensing unit 40. Apparently, lengths of the optical paths for the fingerprint image and the vein image are not identical. This is because the target to be detected (i.e., the fingerprint) in the fingerprint-detecting area 51 is located under the lower surface of the finger 9, while the target to be detected (i.e., the vein) in the vein-detecting area 52 is located inside the finger 9. Therefore, the optical path inside the vein-detecting area 52 is longer than that inside the fingerprint-detecting area 51. The thickness difference h6 at the bottom planes is to account for adjusting the final imaging position of the fingerprint and the vein images.

Figure 7A:
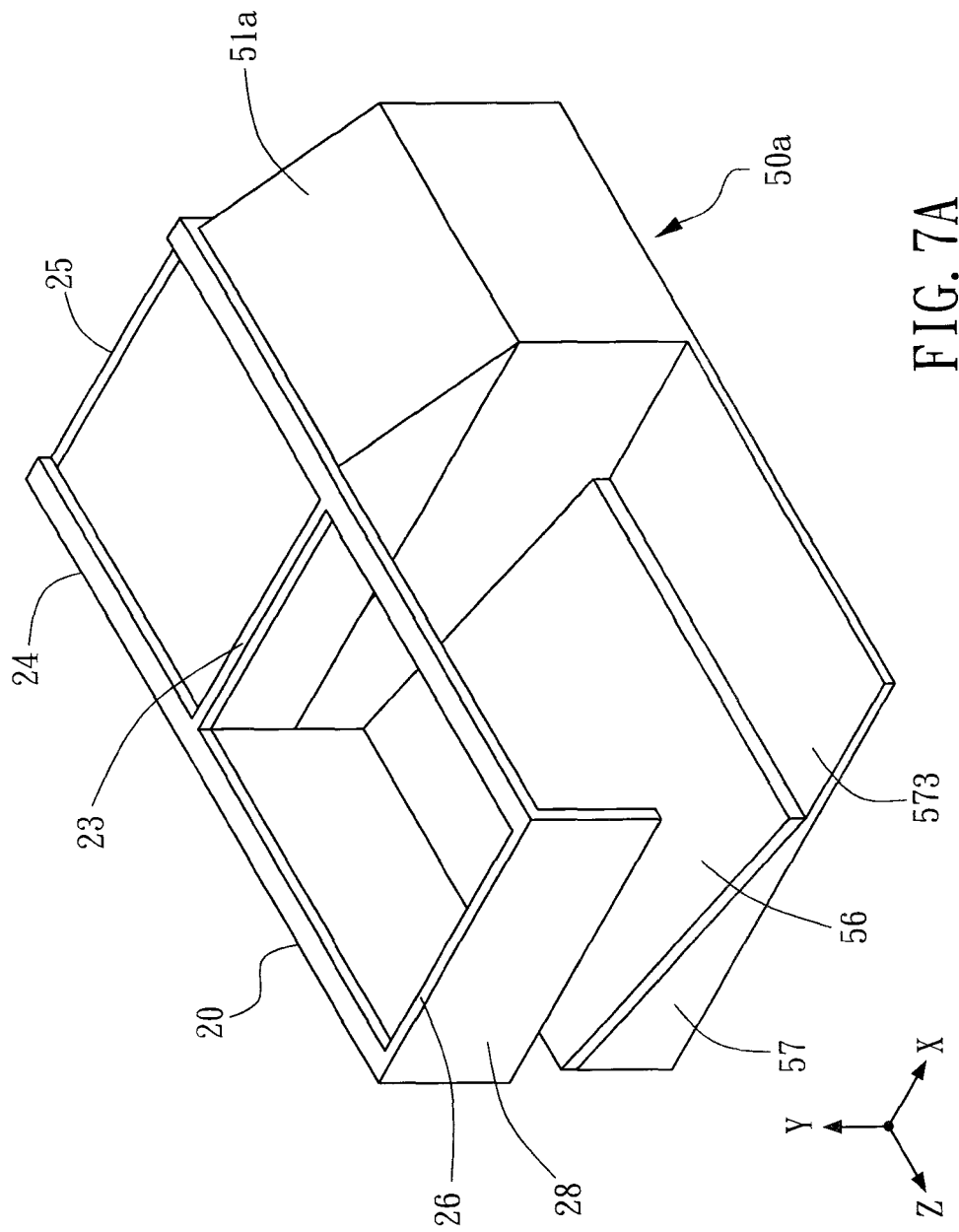
FIG. 7A is a perspective view of another embodiment of the light guide module 50a and the position structure 20 in accordance with the present invention.
Figure 7B:
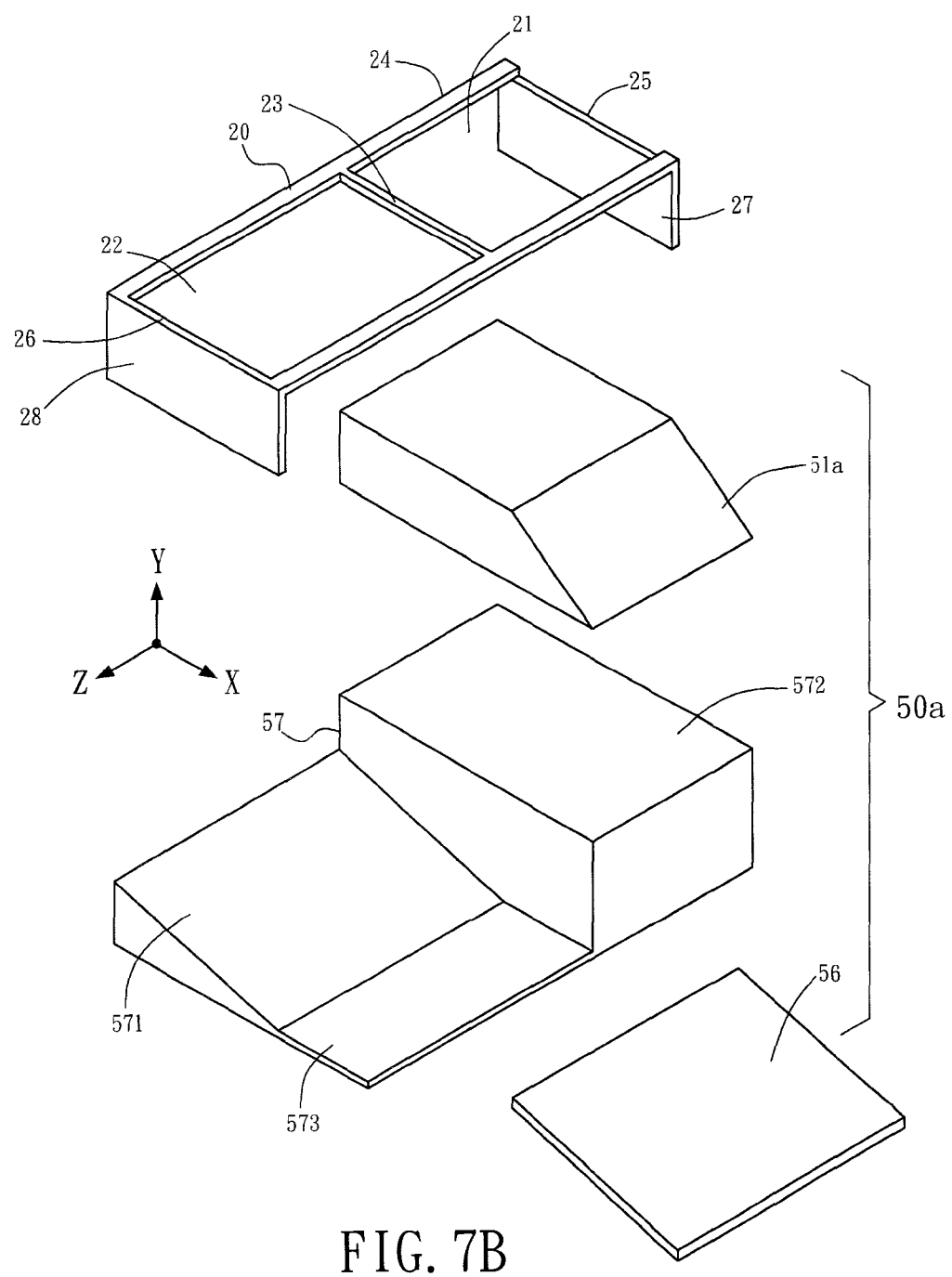
FIG. 7B is an exploded view of FIG. 7A.

Referring now to FIG. 7A and FIG. 7B, another embodiment of the light guide module 50a for the biometric authentication device in accordance with the present invention is shown in a perspective view and an exploded view, respectively. In this embodiment, the light guide module 50a further includes a prism unit (the prism unit as described above), a mirror 56 and a mirror base 57 for mounting the mirror 56. The prism unit is to form the fingerprint-detecting area 50a, while the mirror 56 is to form the vein-detecting area. The prism unit (the fingerprint-detecting area 51a) located under the front window 21 of the position structure is mounted on a platform 572 of the mirror base 57. The mirror 56 is installed to an oblique surface 571 of the mirror base 57. A flat surface 573 is extended horizontally from and connects the oblique surface 56 at the side close to the image-sensing unit 40. By providing the reflection mirror 56 to the biometric authentication device for capturing the fingerprint image and the vein image simultaneously, the advantage of a simplified design without further consideration on different optical paths corresponding to plural prism units can be achieved in. However, in this embodiment, the adopting of the single prism unit to pair the corresponding mirror so as to form a reduced structured light guide module would pay as a tradeoff in a larger occupied volume and a lengthy optical path.

Figure 8:
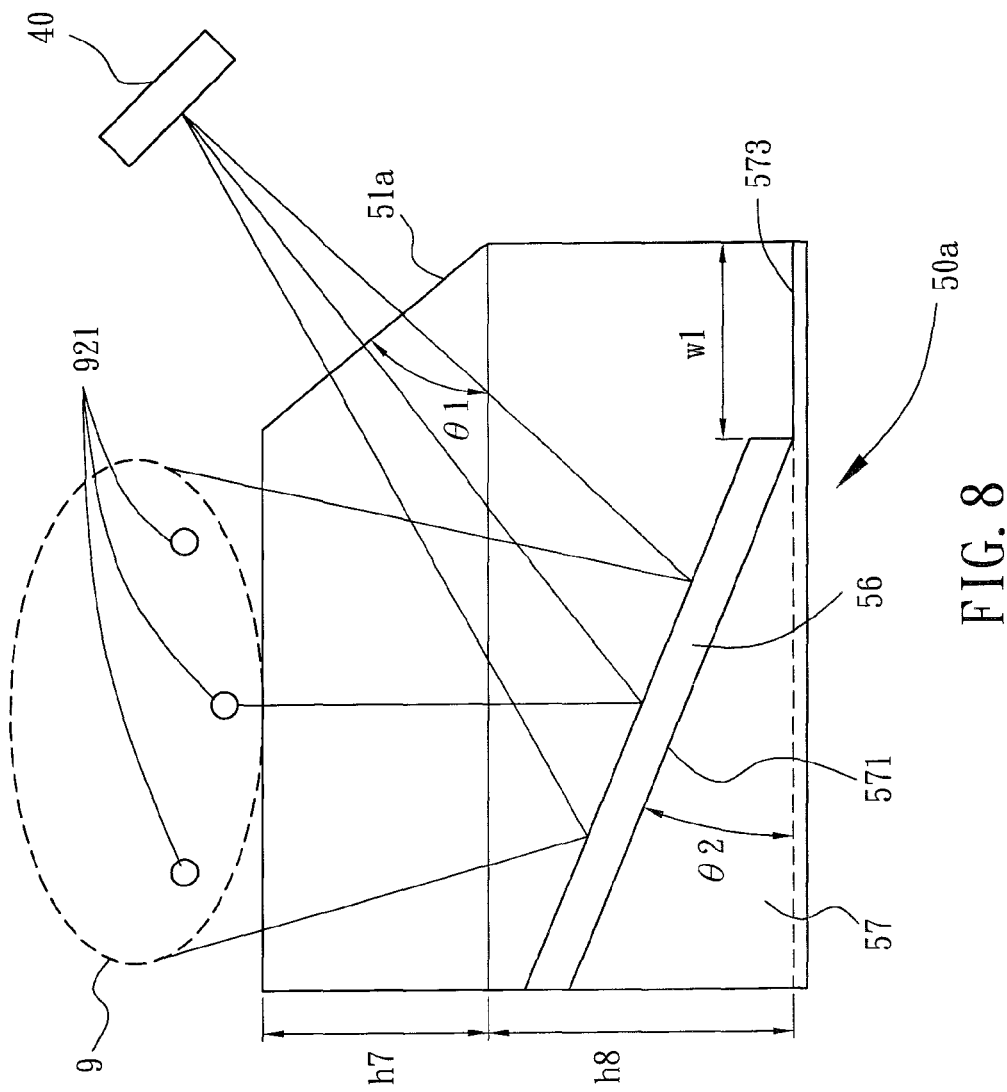
FIG. 8 shows schematically the optical path of the light guide module 50a of FIG. 7A.

As shown in FIG. 8, optical paths for the light guide module 50a of FIG. 7A are schematically shown. The angle θ2 of the mirror 56 is ½ of the oblique angle θ1 of the imaging surface of the prism unit (the fingerprint-detecting area 51a); i.e. θ1=2θ2. The height h7 +h8 is defined as the total height measured from the top of the flat surface 573 of the mirror base 57 to the tip of the fingerprint-detecting area 51a of the prism unit, in which h7 is the thickness of the fingerprint-detecting area 51a and h8 is the distance between the top of the flat surface 573 and the top of the platform 57. It is noted that h8 might not be equal to the elevation height of the mirror 56. In the present invention, the ratio of h7 to h8 is 0.67 (i.e. h7:h8=2:3). The elevation height of the mirror 56 is determined by the angle θ2 and the distance w1 measured horizontally from the lower end of the mirror 56 to the lower end of the imaging surface of the prism unit (the fingerprint-detecting area 51a); i.e. the width of the flat surface 573. Preferably, w1 is equal to h7. In the case that the lateral light projects through the finger 9 at a specific angle, the penetrating light would be reflected by the mirror 56, and then to leave the carrier base from the fingerprint-detecting area 51a of the prism unit. Apparently, in this embodiment, the adopting of the mirror to totally reflect all the incoming rays can also form the biometric authentication device and also can perform the image-capturing process.

Figure 9A:
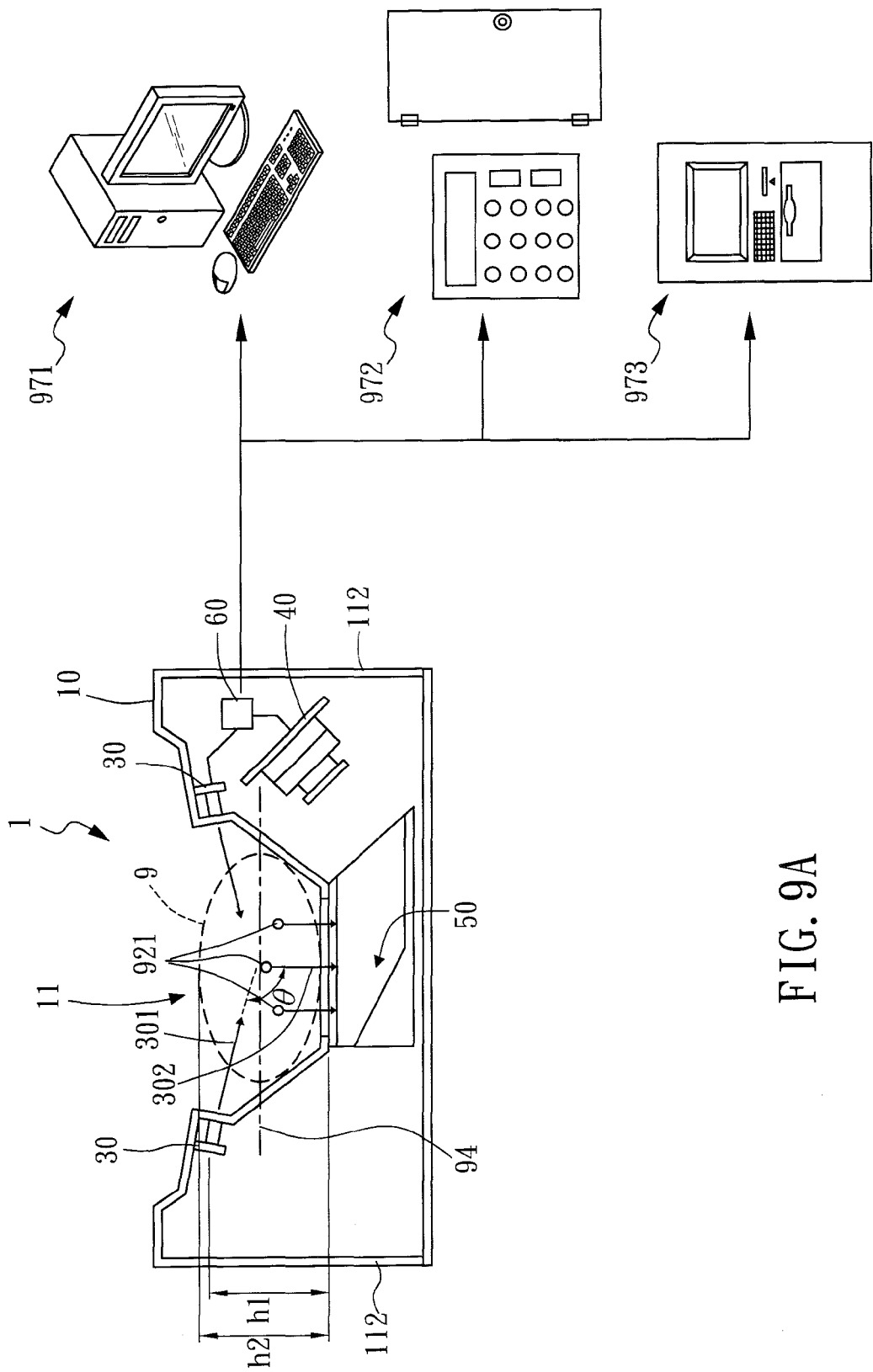
FIG. 9A shows an application of the biometric authentication device of FIG. 1 to a biometric authentication system.
Figure 9B:
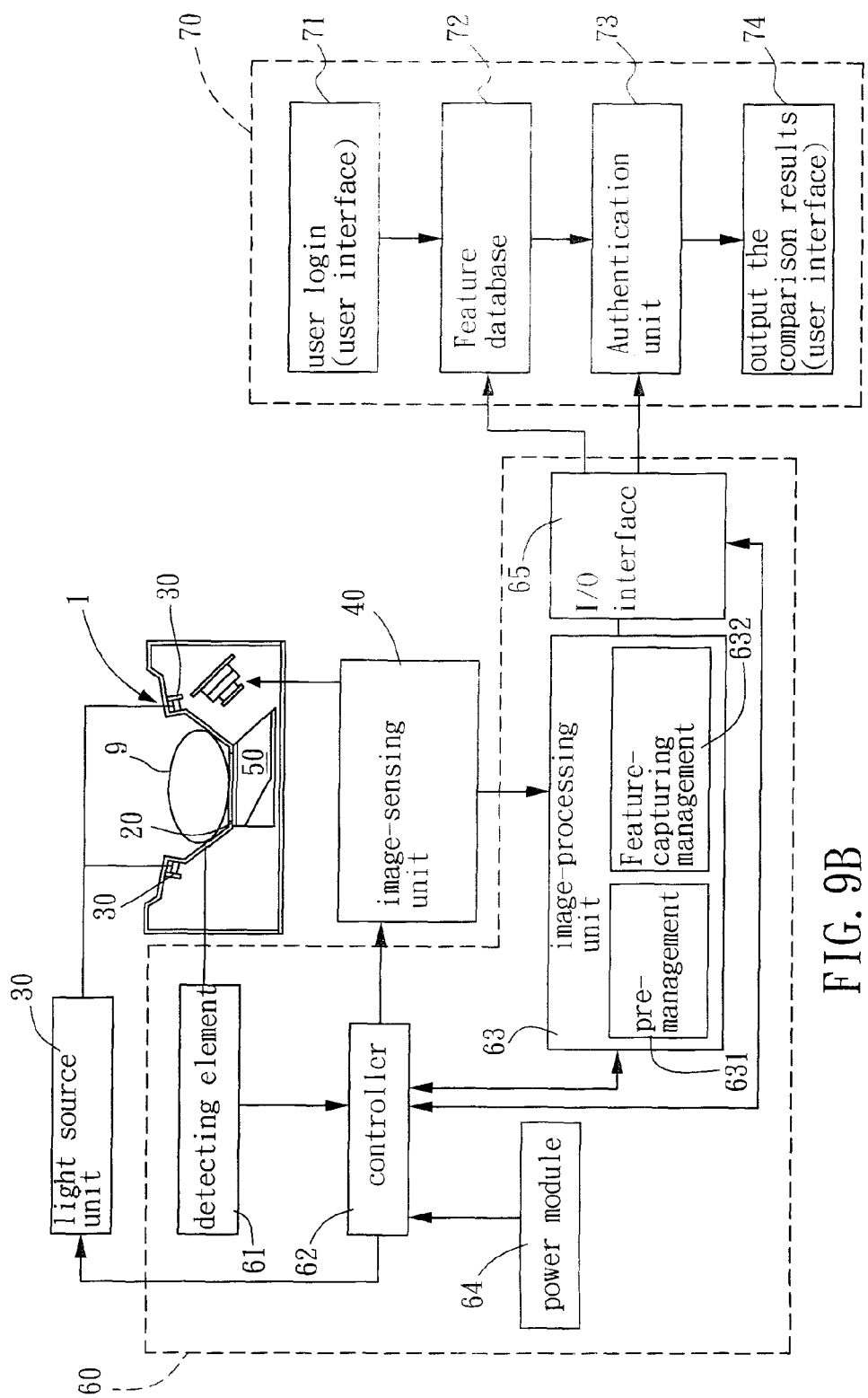
FIG. 9B shows a block diagram of a first embodiment of the control module for the biometric authentication device of the present invention.

Referred now to FIG. 9A and FIG. 9B, an application of the biometric authentication device of FIG. 1 to a security system and a block diagram of a first embodiment of the control module for the biometric authentication device of the present invention are shown, respectively. In this application, the control module 60 of the biometric authentication device 1 connects electrically at least with the at least one light source unit 30 and the image-sensing unit 40. The control module 60 is to control the illumination of the light source unit 30 and is to receive the detection signal from the image-sensing unit 40, in which the detection signal includes simultaneously both the fingerprint image and the vein image. The detection signal is processed in advance before it is sent to an authentication module 70 for signal effective comparison. In the present invention, the authentication module 70 can be a built-in module or a foreign module for a system that requires security protection. In this application, the authentication module 70 can be connected with a computer apparatus 971, a door-alarm apparatus 972, a financial transaction apparatus 973 (a teller machine for example), or any the like. Also, the authentication module 70 can be built inside the biometric authentication device so as to form a compact and portable biometric authentication device with the authentication module 70. The biometric authentication device can be a wireless device or a cabled device, both of which can be connect with a portable electronic information apparatus such as a notebook computer, a tabular computer, a smart phone, and so on.

As shown in FIG. 9B, the control module 60 further includes a detecting element 61, a controller 62, an image-processing unit 63 and a power module 64. The detecting element 61 is to detect if or not the PTBV 9 is in the upper opening 11. For various candidate parts already in the marketplace (such as photo detectors, touch switches, pressure sensor, and so on) can be introduced to act as the detecting element 61 of the present invention and for this detecting element 61 is not one of the major features of the present invention, details thereabout are omitted herein. The controller 62 connecting electrically with the detecting element 61 is to determine the at least one light source unit 30 to project the at least one lateral light according to a detection of the detecting element 61. The image-processing unit 63 connecting electrically with the image-sensing unit 40 and the controller 62 is to receive the detection signal from the image-sensing unit 40 and to further perform a pre-management 631 and a feature-capturing management 632. The power module 64 is to provide electricity to energize the biometric authentication device. In the present invention, the pre-management 631 is to perform de-noise and image-rounding processes upon the detection signal, and the feature-capturing management 632 is to extract a fingerprint feature data and a vein feature data from the fingerprint image and the vein image of the detection signal.

In the present invention, the authentication module 70 is connecting electrically with the control module 60. In the first application embodiment as shown in FIG. 9A and FIG. 9B, the authentication module 70 is located exteriorly to the carrier base 10 of the device 1, and is communicated, either wirelessly or by cables, with an I/O interface 65 of the control module 60. The I/O interface 65 is also connected electrically with the controller 62 and the image-processing unit 63. However, in another embodiment not shown in the figure, the authentication module 70 can also be directly built inside the device 1 and connected electrically with the image-processing unit 63 without detouring to the I/O interface 65.

In the present invention, the authentication module 70 further includes a user interface 71, a feature database 72 and an authentication unit 73. The user interface 71 for login a user. The feature database 72 is to pre-store at least the fingerprint feature data and the vein feature data of the user. The authentication unit 73 is to compare the fingerprint feature data and the vein feature data received from the image-processing unit 63 of the control module 60 with the fingerprint feature data and the vein feature data pre-stored in the feature database 72 so as to generate a comparison result for outputting to the user interface 71 (see block 74). In the case that the fingerprint feature data and the vein feature data of the image-processing unit 63 are forwarded to the feature database 72, a login process is performed. At this time, an allowable signal will be issued to the I/O interface 65 and then the prospective login is accepted. On the other hand, in the case that the fingerprint feature data and the vein feature data of the image-processing unit 63 are forwarded to the authentication unit 73, a comparing process is performed. The authentication unit 73 will perform the comparison between the incoming data and the pre-stored data and then generate a comparison result. The comparison result will be forwarded to the user interface 71 (see also block 74) to make known the comparison result.

In FIG. 9B, a foreign authentication module 70 is shown to help an identification process upon the testing in the device 1. Yet, in FIG. 9C, the authentication module 70 is directly constructed inside the biometric authentication device 1 so as to perform the identification inside the device 1. Upon such an arrangement, the biometric authentication device 1 can be formed as a portable and systematic-modulated biometric authentication device.

Figure 9C:
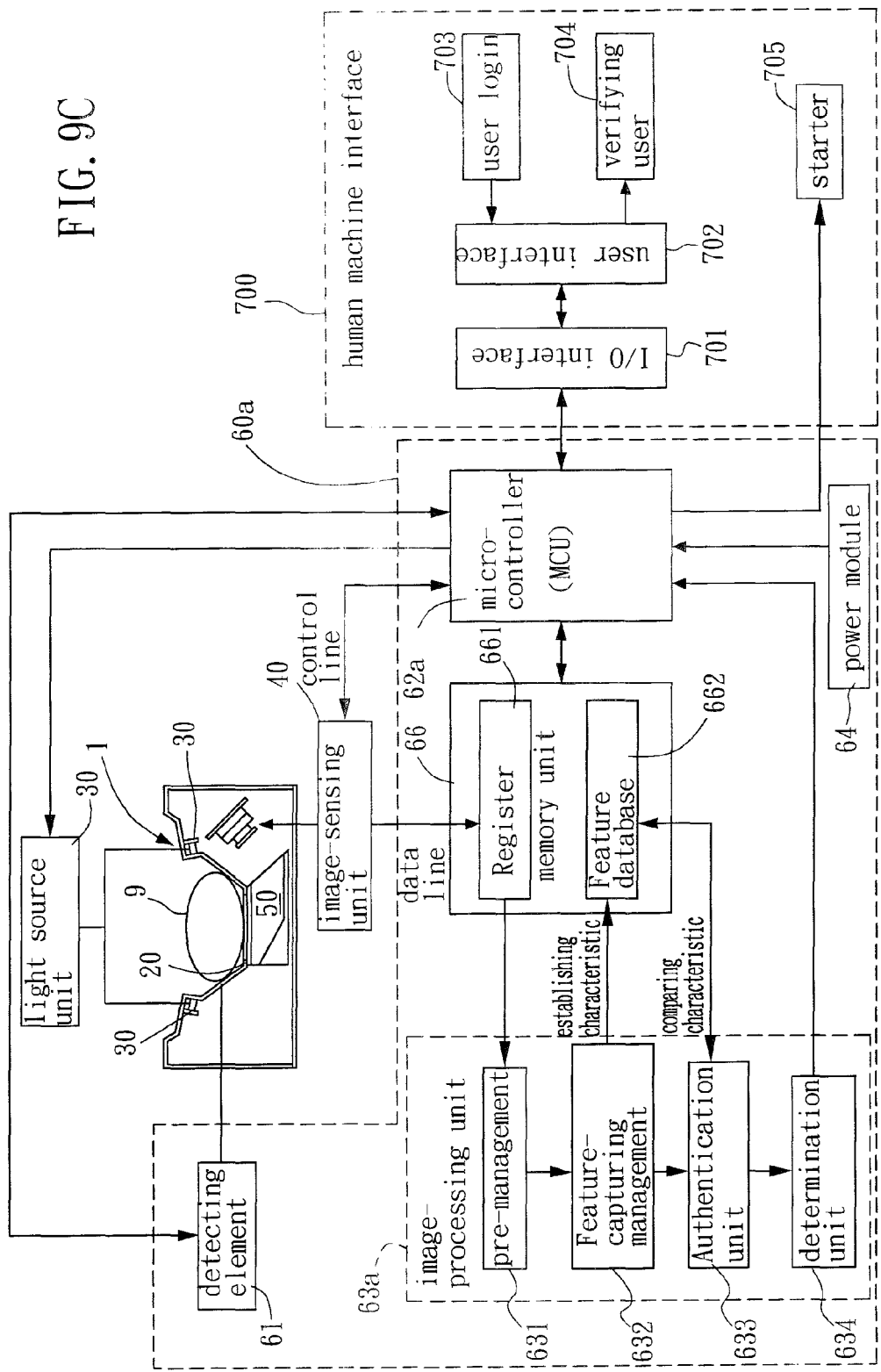
FIG. 9c shows a block diagram of a second embodiment of the control module for the biometric authentication device of the present invention.

As shown in FIG. 9C, the systematic biometric authentication device 1 can also include the same carrier base 10, the same position structure 20, the same light source unit 30, the same image-sensing unit 40 and the same light guide module 50, as the embodiment described above. The only difference between this embodiment and the previous embodiment is only at the internal structuring of the control module 60a and the human-machine interface 700. As shown in FIG. 9C, the control module 60a includes a detecting unit 61, a micro-controller (MCU) 62a, an image-processing unit (DSP) 63a, a power module 64 and a memory unit 66. The human-machine interface 700 further includes an I/O interface 701, a user interface 702, a mechanism for user login 703, a mechanism for verifying user 704 and a starter 705. In the control module 60a, the micro-controller 62a is to communicate with the human-machine interface 700 and to coordinate all the operation of the internal elements. When the login process 703 is performed, the user interface 702 would send a signal to tell the micro-controller 62a via the dual I/O interface 701 that a login process needs to be executed. Then, the micro-controller 62a would initiate the image-sensing unit 40 and the light source unit 30 and send another signal back to the user interface 702 to acknowledge the user to initiate the login process by performing three times of image capturing process. The detecting element 61 is introduced to judge if three times of the image-capturing process have been performed. The image-sensing unit 40 forwards the captured images back to be temporarily stored in the register 661 of the memory unit 66. Then, the register 661 would forward the images to the image-processing unit 63a for performing the image-processing. When the feature images arrive the image-processing unit 63a, the pre-management 631 would be performed thereon to amend the images so as to have the contours inside the images easy to be identified. Thereafter, the feature-capturing management 632 is performed to obtain a result containing the fingerprint feature data and the vein feature data. The result is then forwarded to the memory unit 66 and to be stored in the feature database 662. Also, at the same time, the micro-controller 62a is requested to issue a message to the user interface 702 to let known that the establishment of the user featured data is complete. At this time, the characteristic/feature forwarding routine of the present invention is fulfilled.

The feature authentication routine is performed as follows. When the user places his/her finger 9 into the detection area and the detecting element 61 gets a positive detection, the detecting element 61 would issue a signal to the micro-controller 62a. The micro-controller 62a would then send a corresponding signal to initiate the light source unit 30 and the image-sensing unit 40 to perform image-capturing. After the image-sensing unit 40 forwards the captured image data to the register 661 of the memory unit 66, the pre-management 631 of the image-processing unit 63a would retrieve data inside the register 661 so as to begin the image-processing. The feature-capturing management 632 is then performed to process the data forwarded from the pre-management 631, and the result in the feature-capturing management 632 would be forwarded to the authentication unit 633. The authentication unit 633 would compare the data (including the fingerprint feature data and the vein feature data) from the feature-capturing management 632 with the corresponding pre-stored data in the feature database 662, in which the feature database 662 can pre-store at least one the fingerprint feature data and the vein feature data of at least one user. The comparison result of the authentication unit 633 would be forwarded to the determination unit 634 for the determination unit 634 to decide if the user is a correct user. The decision result in the determination unit 634 would be forwarded to the micro-controller 62a. In the case that the micro-controller 62a gets a wrong message from the determination unit 634, a corresponding message would be issued to the user interface 702 to tell the user that his/her identification fails and a renewal might be needed. In the case that the micro-controller 62a gets a correct message from the determination unit 634, a corresponding correct message would be also issued to the user interface 702 and, at the same time, another signal is generated and forwarded to the starter 705 to allow the user accessible to the system.

Figure 10:
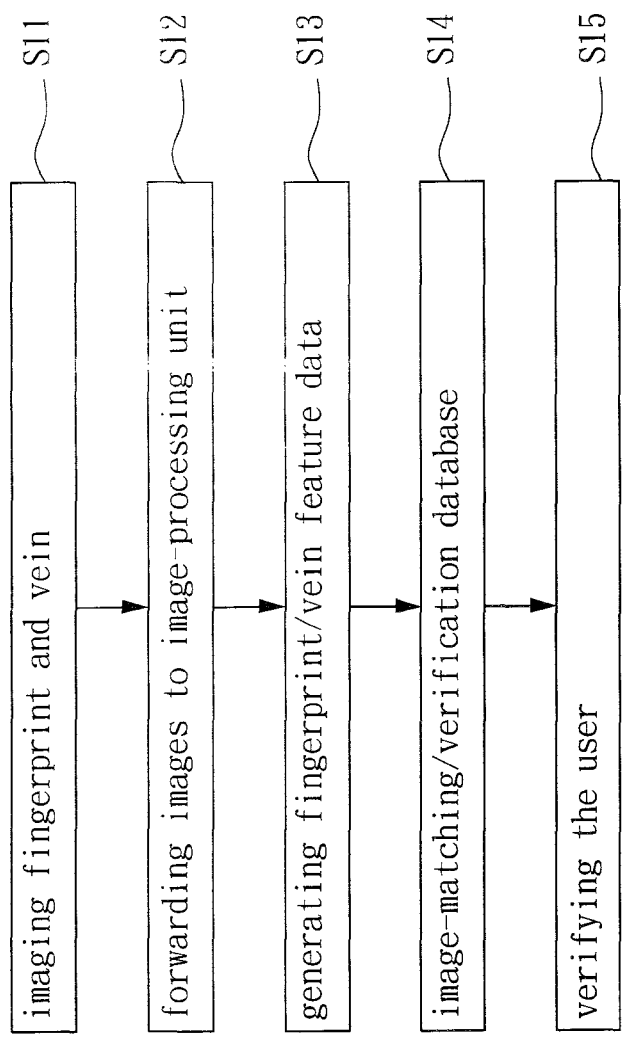
FIG. 10 is a simplified flowchart to demonstrate the biometric authentication method in accordance with the present invention.

Referring now to FIG. 10, a simplified flowchart to demonstrate the biometric authentication method in accordance with the present invention is shown. In step S11, the prism unit (the light guide module 50) and the image-sensing unit 40 are cooperatively used to capture the fingerprint image and the vein image which are combined in one single image. Then, in step S12, the image-sensing unit 40 forwards the aforesaid image to the image-processing unit 63. In step S13, the image-processing unit 63 performs the feature-capturing management 632 to generate the corresponding fingerprint/vein feature data. In step S14, the corresponding fingerprint/vein feature data is sent to the feature database 72 and the authentication unit 73 of the authentication module 70 for performing feature matching comparison process so as thereby to verify if the user is correct (as shown in step S15).

Figures 11A, 11B:
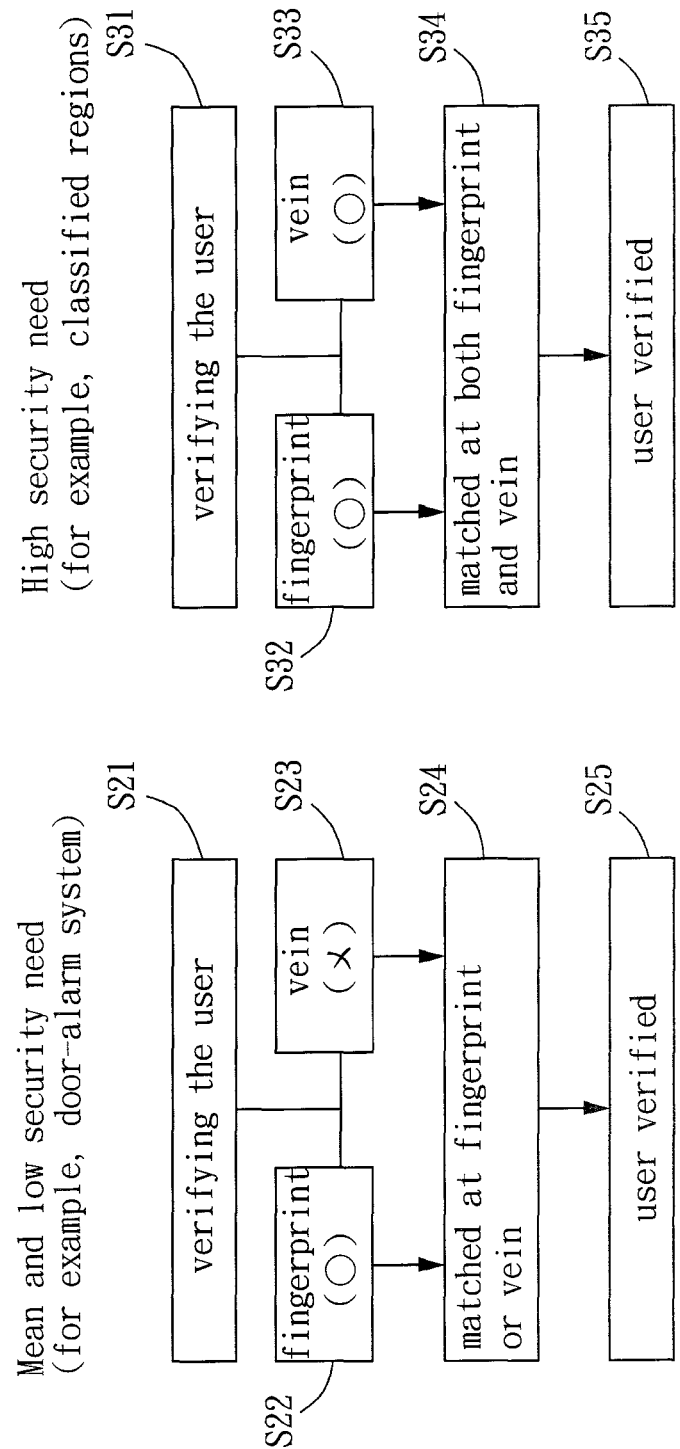
FIG. 11A shows schematically a typical application of the biometric authentication method of the present invention to a mean or low-level security need environment.
FIG. 11B shows schematically a typical application of the biometric authentication method of the present invention to a high security need environment.

Referring now to FIG. 11A and FIG. 11B, typical applications of the biometric authentication method of the present invention to a mean/low security need environment and a high security need environment are shown, respectively. It is noted that the biometric authentication device of the present invention can process a single-function authentication and/or a multiple-function authentication. In the case that the biometric authentication device of the present invention is chosen to perform a single-function authentication (S21) as shown in the example of FIG. 11A for a mean/low security need environment, a correct result of the authentication (S25) can be obtained upon either one of the comparisons, the fingerprint (S22) or the vein (S23), is met (S24). For example, in the plot of FIG. 11A, the fingerprint comparison (S22) is matched, but the vein comparison (S23) fails. However, even the vein matching is failed in S23, the authentication result in S25 is still correct. Apparently, such an authentication process meets popular needs, in particular well for the environment that some users might have problems in demonstrating clear fingerprints for some inevitable reasons. In this circumstance, the vein authentication can be more suitable. Nevertheless, both the fingerprint and the vein feature data of all the qualified users are recommended to be pre-stored in the memory unit of the biometric authentication device. On the other hand, if a dual biometric authentication device is chosen to perform the authentication (S31) as shown in FIG. 11B for a high security need environment, a positive result of the authentication (S35) can be obtained only upon both the comparisons, the fingerprint (S32) and the vein (S33), are simultaneously met (S34). Such an application environment may include the financial and the research institutes.

Further, the biometric authentication method in accordance with the present invention is to verify at least a biometric authentication on a portion of a creature (portion-to-be-verified or PTBV, thereinafter) and comprises the steps of:

providing a biometric authentication device, the biometric authentication device comprising: a carrier base, at least one light source unit, an image-sensing unit and a control module; the carrier base being used to receive the PTBV, the at least one light source unit being to project a light onto the PTBV so as to generate a fingerprint image and a vein image corresponding to the PTBV, the image-sensing unit being to receive the fingerprint image and the vein image and thereby further to generate a detection signal readable to a computer; wherein the detection signal includes simultaneously messages of the fingerprint image and the vein image; wherein the control module connecting electrically at least with the at least one light source unit and the image-sensing unit is to receive the detection signal from the image-sensing unit;

arranging the PTBV to the biometric authentication device so as thereby to generate simultaneously the detection signal including the messages of the fingerprint image and the vein image;

the control module of the biometric authentication device receiving the detection signal and further extracting thereinside a fingerprint feature data from the fingerprint image and a vein feature data from the vein image; and applying a authentication unit to compare the fingerprint feature data and the vein feature data received from the image-sensing unit of the control module with the fingerprint feature data and the vein feature data pre-stored in the feature database so as to generate a comparison result.

In accordance with the present invention, the biometric authentication device 1 able to identify the fingerprint and the vein feature simultaneously includes mainly at least one light source unit 30, a prism unit (light guide module 50), a position structure 20, an image-sensing unit 40 and a control module 60. The user for the device 1 must firstly perform a login process to connect the user interface for determining the user options. Internally, the device 1 would acknowledge the feature database 72 to establish a user's feature data, and at the same time, the user is asked to place his/her finger 9 into the device 1. While in the login process, the finger 9 is needed to stay in the device with the inter-member valley 93 between the first finger member 91 and the second finger member 92 to anchor upon the position rib 23 in the middle of the position structure 20. Also, the front end of the first finger member 91 is to contact tightly at the top surface 511 of the fingerprint-detecting area 51 of the prism unit (light guide module 50), while the rear end of second finger member 92 is to be located in the rear finger-anchoring area 26. Then, the detecting element 61 would sense the finger 9 and notify the controller 62 the existence of the finger 9 so as to activate the light source unit 30 and the image-sensing unit 40. The image-sensing unit 40 would perform the imaging exposure control according to its firmware settings, in which the exposure control is obtained by controlling the shutter speed. Through the foregoing exposure control, relevant image exposure can be better achieved even upon facing users with different finger thicknesses. The captured images would be forwarded to the image-processing unit 63 for performing pre-management

631 so as to make clear the contours in the fingerprint and the vein images. After the pre-management 631, the amended images are then forwarded to the feature-capturing management 632 for performing the extracting of the required biometric. The extracted feature data are then compared with the corresponding feature data pre-stored in the feature database 72. The comparison result is finally outputted to the user interface 71. One merit of the device 1 in accordance with the present invention is that the security levels can be variously selected according to the practical needs. While in a mean/low security need circumstance, the correct authentication result can be obtained by matching any single one of the feature, the fingerprint or the vein. Such a circumstance can be found in a door-alarm system for plenty of the qualified users might have problems to provide a clean finger. On the other hand, if an application environment needs higher security control, the correct authentication result can be obtained only by matching both two features, the fingerprint and the vein. Such an application can avoid loss from a piracy feature data and can be seen in most of the financial units and the classified districts.

While the present invention has been particularly shown and described with reference to a preferred embodiment, it will be understood by those skilled in the art that various changes in form and detail may be without departing from the spirit and scope of the present invention.

What is claimed is:

1. A biometric authentication device, for authenticating at least a biometric on a portion of a creature (portion-to-be-verified or PTBV, thereinafter), comprising:
   a carrier base, having an upper opening for receiving the PTBV, which the upper opening further has a base plane and at least one lateral surface;
   a position structure, located at the carrier base at a position respective to the upper opening, being used to assist the PTBV to anchor at a predetermined position at the carrier base in the upper opening;
   at least one light source unit, located at the at least one lateral surface of the carrier base respective to the upper opening; in the case that the PTBV reaches the predetermined position, the at least one light source unit being positioned laterally to the PTBV, and the at least one light source unit being able to project at least one lateral light onto the PTBV so as to generate and at least one corresponding image response;
   an image-sensing unit, located inside the carrier base to receive the at least one image response and further to form thereby a corresponding detection signal readable to a computer; and
   a light guide module and a filter, the light guide module being located inside the carrier base at a position under the base plane respective to the upper opening, the at least one image response entering the carrier base through the bottom portion of the upper opening and being further projected onto the image-sensing unit by the light guide module, the filter being located at one of an inside of the image-sensing unit and an outside of the image-sensing unit for filtering out visible lights so as to enhance a identification rate of a particular wavelength;
   wherein:
   the at least one light source unit further includes a plurality of Infra-red Vertical-cavity Surface-emitting Lasers (IR-VCSELs), and a vertical height h1 between a mean central point of the at least one light source unit at a perpendicular direction and the base plane of the upper opening is no less than one half of a mean vertical thickness h2 of the PTBV;
   the PTBV is at least a portion of a first finger member and a second finger member of a finger, the plurality of IR-VCSELs is located at a lateral side of the PTBV along a direction extended from the first finger member to the second finger member;
   the position structure formed as a finger-anchoring structure located on the base plane further includes a front window, a rear window and a position rib between the front window and the rear window; while an inter-member valley between the first finger member and the second finger member falls onto the position rib, the first finger member is anchored in the front window and the second finger member is anchored in the rear window,
   the light guide module having at least one prism unit is separated into a fingerprint-detecting area respective to the front window and a vein-detecting area respective to the rear window;
   when the at least one lateral light projects on the PTBV, a fingerprint image and a vein image being formed simultaneously on the image-sensing unit through the fingerprint-detecting area and the vein-detecting area of the light guide module, respectively, the image-sensing unit then generating the detection signal readable to the computer and having messages of the fingerprint image and the vein image;
   the light guide module has one single prism unit separated into the fingerprint-detecting area and the vein-detecting area;
   the fingerprint-detecting area of the prism unit further includes thereof a top surface, a bottom surface opposing to the top surface, an imaging surface connecting in-between the top surface and the bottom surface, and an anti-reflection surface opposing to the imaging surface, the top surface being neighbored to the front window of the position structure;
   when the PTBV is anchored at the predetermined position in the upper opening, the first finger member of the finger contacting the top surface of the fingerprint-detecting area, the fingerprint image entering the fingerprint-detecting area of the prism unit via the top surface of the fingerprint-detecting area, the fingerprint image being reflected at least once by the bottom surface of the fingerprint-detecting area and then leaving the prism unit through the imaging surface of the fingerprint-detecting area, an oblique angle of the imaging surface of the fingerprint-detecting area helping the leaving fingerprint image to form on the image-sensinq unit, the anti-reflection surface being there to reduce the reflection while lights in the fingerprint-detecting area are projected onto the anti-reflection surface; and
   the vein-detectinq area of the prism unit further includes thereof another top surface, another bottom surface opposing to the another top surface, another imaging surface connecting in-between the another top surface and the another bottom surface, and an reflection surface opposing to the another imaging surface and connecting obliquely the another bottom surface; the top surface of the vein-detecting area being neighbored to the rear window of the position structure; when the PTBV is anchored at the predetermined position in the upper opening, the second finger member of the finger being above the top surface of the vein-detecting area without any contact in between, the vein image entering the vein-detecting area of the prism unit via the top surface of the vein-detectinq area, the vein image being reflected at least once individually by the reflection surface, the top surface and the bottom surface of the vein-detecting area and then leaving the prism unit through the imaging surface of the vein-detecting area, an oblique angle of the imaging surface of the vein-detecting area helping the leaving vein image to form on the image-sensing unit; an imaging optical path of the vein image being dependent on a vertical height between the top surface and the bottom surface of the vein-detecting area and a reflection frequency of the vein image inside the vein-detecting area, in which the reflection frequency is determined by the oblique angle between the reflection surface and the bottom surface of the vein-detecting area.

2. The biometric authentication device according to claim 1, wherein the at least one lateral light projected by the at least one light source unit defines a virtual central projection line, a projection direction of the at least one image response downward into the carrier base defines a virtual vertical projection line, and the angle θ between the virtual central projection line and the virtual vertical projection line is ranged between 30 and 150 degrees.

3. The biometric authentication device according to claim 2, wherein the angle θ is ranged between 30 and 85 degrees when the vertical height h1 is equal to one half of the mean vertical thickness h2, and the angle θ is ranged between 30 and 150 degrees when the vertical height h1 is larger than one half of the mean vertical thickness h2.

4. The biometric authentication device according to claim 1, further including a light-shielding plate located at the position structure and a control module connecting electrically at least with the at least one light source unit and the image-sensing unit, the control module further including:
   a detecting element for detecting if or not the PTBV is in the upper opening;
   a controller, connecting electrically the detecting element, for determining the at least one light source unit to project the at least one lateral light according to a detection of the detecting element; and
   an image-processing unit, connecting electrically the image-sensing unit and the controller, for performing a pre-management and a feature-capturing management while receiving the detection signal from the image-sensing unit;
   wherein the pre-management is to perform de-noise and image optimization processes upon the detection signal, and the feature-capturing management is to extract a fingerprint feature data and a vein feature data from the fingerprint image and the vein image of the detection signal.

5. A biometric authentication device, for verifying at least a biometric on a portion of a creature (portion-to-be-verified or PTBV, thereinafter), comprising:
   a carrier base, having an upper opening for receiving the PTBV, which the upper opening further has a base plane and at least one lateral surface;
   a position structure, located at the carrier base at a position respective to the upper opening, being used to assist the PTBV to anchor at a predetermined position at the carrier base in the upper opening;
   at least one light source unit, located at the at least one lateral surface of the carrier base respective to the upper opening; in the case that the PTBV reaches the predetermined position, the at least one light source unit being positioned laterally to the PTBV, and the at least one light source unit being able to project at least one lateral light onto the PTBV so as to generate and at least one corresponding image response;
   a light guide module, located inside the carrier base at a position under the base plane respective to the upper opening; and
   an image-sensing unit, located inside the carrier base to receive the at least one image response and further to form thereby a corresponding detection signal readable to a computer; the at least one image response of the PTBV entering the carrier base through the base plane of the upper opening and being further to be projected onto the image-sensing unit via the light guide module;
   wherein the light guide module further includes at least one prism unit and is separated into a fingerprint-detecting area and a vein-detecting area; a fingerprint image and a vein image corresponding to the PTBV being formed by projecting the at least one lateral light of the at least one light source onto the PTBV, the fingerprint image being formed on the image-sensing unit through the fingerprint-detecting area of the light guide module, the vein image being formed on the image-sensing unit through the vein-detecting area of the light guide module;
   wherein:
   when the at least one lateral light projects on the PTBV, the fingerprint image and the vein image are formed simultaneously on the image-sensing unit through the fingerprint-detecting area and the vein-detecting area of the light guide module, respectively, and then the image-sensing unit generates the detection signal readable to the computer and having messages of the fingerprint image and the vein image;
   the PTBV is at least a portion of a first finger member and a second finger member of a finger;
   the position structure formed as a finger-anchoring structure located on the base plane further includes a front window, a rear window and a position rib between the front window and the rear window; while an inter-member valley between the first finger member and the second finger member falls onto the position rib, the first finger member is anchored in the front window and the second finger member is anchored in the rear window;
   the fingerprint-detecting area is respective to the front window and the vein-detecting area is respective to the rear window
   the light guide module has one single prism unit separated into the fingerprint-detecting area and the vein-detecting area;
   the fingerprint-detecting area of the prism unit further includes thereof a top surface, a bottom surface opposing to the top surface, an imaging surface connecting in-between the top surface and the bottom surface, and an anti-reflection surface opposing to the imaging surface, the top surface being neighbored to the front window of the position structure;
   when the PTBV is anchored at the predetermined position in the upper opening, the first finger member of the finger contacting the top surface of the fingerprint-detecting area, the fingerprint image entering the fingerprint-detecting area of the prism unit via the top surface of the fingerprint-detecting area, the fingerprint image being reflected at least once by the bottom surface of the fingerprint-detecting area and then leaving the prism unit through the imaging surface of the fingerprint-detecting area, an oblique angle of the imaging surface of the fingerprint-detecting area helping the leaving fingerprint image to form on the image-sensing unit, the anti-reflection surface being there to reduce the reflection while lights in the fingerprint-detecting area are projected onto the anti-reflection surface; and the vein-detecting area of the prism unit further includes thereof another top surface, another bottom surface opposing to the another top surface, another imaging surface connecting in-between the another top surface and the another bottom surface, and an reflection surface opposing to the another imaging surface and connecting obliquely the another bottom surface; the top surface of the vein-detecting area being neighbored to the rear window of the position structure; when the PTBV is anchored at the predetermined position in the upper opening the second finger member of the finger being above the top surface of the vein-detecting area without any contact in between, the vein image entering the vein-detecting area of the prism unit via the top surface of the vein-detecting area, the vein image being reflected at least once individually by the reflection surface, the top surface and the bottom surface of the vein-detecting area and then leaving the prism unit through the imaging surface of the vein-detecting area, an oblique angle of the imaging surface of the vein-detecting area helping the leaving vein image to form on the image-sensing unit; an imaging optical path of the vein image being dependent on a vertical height between the top surface and the bottom surface of the vein-detecting area and a reflection frequency of the vein image inside the vein-detecting area, in which the reflection frequency is determined by the oblique angle between the reflection surface and the bottom surface of the vein-detecting area.

6. The biometric authentication device according to claim 5, wherein the at least one light source unit further includes a plurality of Infra-red Vertical-cavity Surface-emitting Lasers (IR-VCSELs), and a vertical height h1 between a mean central point of the at least one light source unit at a perpendicular direction and the base plane of the upper opening is no less than one half of a mean vertical thickness h2 of the PTBV.

7. The biometric authentication device according to claim 6, wherein the at least one lateral light projected by the at least one light source unit defines a virtual central projection line, a projection direction of the at least one image response downward into the carrier base defines a virtual vertical projection line, and the angle θ between the virtual central projection line and the virtual vertical projection line is ranged between 30 and 150 degrees.

8. The biometric authentication device according to claim 5, further including a light-shielding plate located at the position structure and a control module connecting electrically at least with the at least one light source unit and the image-sensing unit, the control module further including:
- a detecting element for detecting if or not the PTBV is in the upper opening;
- a controller, connecting electrically the detecting element, for determining the at least one light source unit to project the at least one lateral light according-to a detection of the detecting element; and
- an image-processing unit, connecting electrically the image-sensing unit and the controller, for performing a pre-management and a feature-capturing management while receiving the detection signal from the image-processing unit;
wherein the pre-management is to perform de-noise and image optimization processes upon the detection signal, and the feature-capturing management is to extract a fingerprint feature data and a vein feature data from the fingerprint image and the vein image of the detection signal.

9. A biometric authentication device, for verifying at least a biometric on a portion of a creature (portion-to-be-verified or PTBV, thereinafter), comprising:
- a carrier base, having an upper opening for receiving the PTBV, which the upper opening further has a base plane and at least one lateral surface;
- a position structure, located at the carrier base at a position respective to the upper opening, being used to assist the PTBV to anchor at a predetermined position at the carrier base in the upper opening;
- at least one light source unit, located at the at least one lateral surface of the carrier base respective to the upper opening; in the case that the PTBV reaches the predetermined position, the at least one light source unit being positioned laterally to the PTBV, and the at least one light source unit being able to project at least one lateral light onto the PTBV so as to generate and at least one corresponding image response;
- an image-sensing unit, located inside the carrier base to receive the at least one image response and further to form thereby a corresponding detection signal readable to a computer; the at least one image response of the PTBV entering the carrier base through the base plane of the upper opening and being further to be projected onto the image-sensing unit via a light guide module;
- a control module, connecting electrically at least with the at least one light source unit and the image-sensing unit;
wherein:
when the at least one lateral light projects on the PTBV, a fingerprint image and a vein image are formed simultaneously on the image-sensing unit through a fingerprint-detecting area and a vein-detecting area of the light guide module, respectively; and then the image-sensing unit generates the detection signal readable to the computer and having messages of the fingerprint image and the vein image;
the light guide module being located inside the carrier base at a position under the base plane respective to the upper opening; the light guide module further includes at least one prism unit and is separated into the fingerprint-detecting area and the vein-detecting area; the PTBV is at least a portion of a first finger member and a second finger member of a finger;
the position structure formed as a finger-anchoring structure located on the base plane further includes a front window, a rear window and a position rib between the front window and the rear window; while an inter-member valley between the first finger member and the second finger member falls onto the position rib, the first finger member is anchored in the front window and the second finger member is anchored in the rear window;
the fingerprint-detecting area is respective to the front window and the vein-detecting area is respective to the rear window;
the light guide module has one single prism unit separated into the fingerprint-detecting area and the vein-detecting area;
the fingerprint-detecting area of the prism unit further includes thereof a top surface, a bottom surface opposing to the top surface, an imaging surface connecting in-between the top surface and the bottom surface, and an anti-reflection surface opposing to the imaging surface, the top surface being neighbored to the front window of the position structure;
when the PTBV is anchored at the predetermined position in the upper opening, the first finger member of the finger contacting the top surface of the fingerprint-detecting area, the fingerprint image entering the fingerprint-detecting area of the prism unit via the top surface of the fingerprint-detecting area, the fingerprint image being reflected at least once by the bottom surface of the fingerprint-detecting area and then leaving the prism unit through the imaging surface of the fingerprint-detecting area, an oblique angle of the imaging surface of the fingerprint-detecting area helping the leaving fingerprint image to form on the image-sensing unit, the anti-reflection surface being there to reduce the reflection while lights in the fingerprint-detecting area are projected onto the anti-reflection surface; and the vein-detecting area of the prism unit further includes thereof another top surface, another bottom surface opposing to the another top surface, another imaging surface connecting in-between the another top surface and the another bottom surface, and an reflection surface opposing to the another imaging surface and connecting obliquely the another bottom surface; the top surface of the vein-detecting area being neighbored to the rear window of the position structure; when the PTBV is anchored at the predetermined position in the upper opening, the second finger member of the finger being above the top surface of the vein-detecting area without any contact in between, the vein image entering the vein-detecting area of the prism unit via the top surface of the vein-detecting area, the vein image being reflected at least once individually by the reflection surface, the top surface and the bottom surface of the vein-detecting area and then leaving the prism unit through the imaging surface of the vein-detecting area, an oblique angle of the imaging surface of the vein-detecting area helping the leaving vein image to form on the image-sensing unit; an imaging optical path of the vein image being dependent on a vertical height between the top surface and the bottom surface of the vein-detecting area and a reflection frequency of the vein image inside the vein-detecting area, in which the reflection frequency is determined by the oblique angle between the reflection surface and the bottom surface of the vein-detecting area.

10. The biometric authentication device according to claim 9, wherein the at least one light source unit further includes a plurality of Infra-red Vertical-cavity Surface-emitting Lasers (IR-VCSELs), and a vertical height $h1$ between a mean central point of the at least one light source unit at a perpendicular direction and the base plane of the upper opening is no less than one half of a mean vertical thickness $h2$ of the PTBV.

11. The biometric authentication device according to claim 10, wherein the at least one lateral light projected by the at least one light source unit defines a virtual central projection line, a projection direction of the at least one image response downward into the carrier base defines a virtual vertical projection line, and the angle $\theta$ between the virtual central projection line and the virtual vertical projection line is ranged between 30 and 150 degrees.

12. The biometric authentication device according to claim 9, further including a light-shielding plate located at the position structure.

13. The biometric authentication device according to claim 9, wherein the control module further including:
a detecting element for detecting if or not.the PTBV is in the upper opening;
a controller, connecting electrically the detecting element, for determining the at least one light source unit to project the at least one lateral light according to a detection of the detecting element; and an image-processing unit, connecting electrically the image-sensing unit and the controller, for performing a pre-management and a feature-capturing management while receiving the detection signal from the image-sensing unit;
wherein the pre-management is to perform de-noise and image optimization processes upon the detection signal, and the feature-capturing management is to extract a fingerprint feature data and a vein feature data from the fingerprint image and the vein image of the detection signal.

14. A biometric authentication method, for verifying at least a biometric on a portion of a creature (portion-to-be-verified or PTBV, thereinafter), comprising the steps of:
providing a biometric authentication device, the biometric authentication device comprising:
a carrier base, at least one light source unit, an image-sensing unit and a control module;
the carrier base being used to receive the PTBV, the at least one light source unit being to project a light onto the PTBV so as to generate a fingerprint image and a vein image corresponding to the PTBV, the image-sensing unit being to receive the fingerprint image and the vein image and thereby further to generate a detection signal readable to a computer; wherein the detection signal includes simultaneous messages of the fingerprint image and the vein image;
wherein the control module connecting electrically at least with the at least one light source unit and the image-sensing unit is to receive the detection signal from the image-sensing unit;
arranging the PTBV to the biometric authentication device so as thereby to generate simultaneously the detection signal including the messages of the fingerprint image and the vein image; and
the control module of the biometric authentication device receiving the detection signal and further extracting thereinside a fingerprint feature data from the fingerprint image and a vein feature data from the vein image, and then these extracted fingerprint feature data and vein feature data being analyzed for authentication purpose;
wherein:
the carrier base has an upper opening for receiving the PTBV, which the upper opening further has a base plane and at least one lateral surface;
the biometric authentication device further includes a position structure and a light guide module, the position structure being located at the carrier base at a position respective to the upper opening and being used to assist the PTBV to anchor at a predetermined position at the carrier base in the upper opening, the light guide module being located inside the carrier base at a position under the base plane respective to the upper opening;
the at least one light source unit is located at the at least one lateral surface of the carrier base respective to the upper opening; in the case that the PTBV reaches the predetermined position, the at least one light source unit being able to project at least one lateral light onto the PTBV so as to generate simultaneously the fingerprint image and the vein image of the PTBV;
the image-sensing unit is located inside the carrier base, the fingerprint image and the vein image of the PTBV entering the carrier base via the base plane of the upper opening the light guide module leading the fingerprint image and the vein image to the imaqe-sensinq unit;

a light guide module is located inside the carrier base at a position under the base plane respective to the upper opening;

the light guide module further includes at least one prism unit and is separated into a fingerprint-detecting area and a vein-detecting area; the PTBV is at least a portion of a first finger member and a second finger member of a finger;

the position structure formed as a finger-anchoring structure located on the base plane further includes a front window, a rear window and a position rib between the front window and the rear window; while an inter-member valley between the first finger member and the second finger member falls onto the position rib, the first finger member is anchored in the front window and the second finger member is anchored in the rear window;

the fingerprint-detecting area is respective to the front window and the vein-detecting area is respective to the rear window;

the light guide module has one single prism unit separated into the fingerprint-detecting area and the vein-detecting area;

the fingerprint-detecting area of the prism unit further includes thereof a top surface, a bottom surface opposing to the top surface, an imaging surface connecting in-between the top surface and the bottom surface, and an anti-reflection surface opposing to the imaging surface, the top surface being neighbored to the front window of the position structure;

when the PTBV is anchored at the predetermined position in the upper opening, the first finger member of the finger contacting the to surface of the fingerprint-detecting area, the fingerprint image entering the fingerprint-detecting area of the prism unit via the top surface of the fingerprint-detecting area, the fingerprint image being reflected at least once by the bottom surface of the fingerprint-detecting area and then leaving the prism unit through the imaging surface of the fingerprint-detecting area, an oblique angle of the imaging surface of the fingerprint-detecting area helping the leaving fingerprint image to form on the image-sensing unit, the anti-reflection surface being there to reduce the reflection while lights in the fingerprint-detecting area are projected onto the anti-reflection surface; and the vein-detecting area of the prism unit further includes thereof another top surface, another bottom surface opposing to the another top surface, another imaging surface connecting in-between the another top surface and the another bottom surface, and an reflection surface opposing to the another imaging surface and connecting obliquely the another bottom surface; the top surface of the vein-detecting area being neighbored to the rear window of the position structure; when the PTBV is anchored at the predetermined position in the upper opening, the second finger member of the finger being above the top surface of the vein-detecting area without any contact in between, the vein image entering the vein-detecting area of the prism unit via the top surface of the vein-detecting area, the vein image being reflected at least once individually by the reflection surface, the top surface and the bottom surface of the vein-detecting area and then leaving the prism unit through the imaging surface of the vein-detecting area, an oblique angle of the imaging surface of the vein-detecting area helping the leaving vein image to form on the image-sensing unit; an imaging optical path of the vein image being dependent on a vertical height between the top surface and the bottom surface of the vein-detecting area and a reflection frequency of the vein image inside the vein-detecting area, in which the reflection frequency is determined by the oblique angle between the reflection surface and the bottom surface of the vein-detecting area.

15. The biometric authentication method according to claim 14, wherein the at least one light source unit further includes a plurality of Infra-red Vertical-cavity Surface-emitting Lasers (IR-VCSELs), and a vertical height h1 between a mean central point of the at least one light source unit at a perpendicular direction and the base plane of the upper opening is no less than one half of a mean vertical thickness h2 of the PTBV.

16. The biometric authentication method according to claim 15, wherein the at least one lateral light projected by the at least one light source unit defines a virtual central projection line, a projection direction of the at least one image response downward into the carrier base defines a virtual vertical projection line, and the angle θ between the virtual central projection line and the virtual vertical projection line is ranged between 30 and 150 degrees.

17. The biometric authentication method according to claim 14, further including a light-shielding plate located at the position structure.

18. The biometric authentication method according to claim 14, wherein the control module further including:

a detecting element for detecting if or not the PTBV is in the upper opening;

a controller, connecting electrically the detecting element, for determining the at least one light source unit to project the at least one lateral light according to a detection of the detecting element; and an image-processing unit, connecting electrically the image-sensing unit and the controller, for performing a pre-management and a feature-capturing management while receiving the detection signal from the image-sensing unit;

wherein the pre-management is to perform de-noise and image optimization processes upon the detection signal, and the feature-capturing management is to extract a fingerprint feature data and a vein feature data from the fingerprint image and the vein image of the detection signal.

* * * * *